United States Patent
Catt et al.

(10) Patent No.: US 10,214,912 B2
(45) Date of Patent: Feb. 26, 2019

(54) KIT OF PARTS FOR MODULAR STAIRCASE

(71) Applicant: LOGRAR GROUP LIMITED, Auckland (NZ)

(72) Inventors: Benjamin Lance Catt, Auckland (NZ); James Powell, Auckland (NZ); Edward Scholten, Auckland (NZ); Craig David Shannon, Auckland (NZ)

(73) Assignee: Lograr Group Limited, Auckland (NZ)

( * ) Notice: Subject to any disclaimer, the term of this patent is extended or adjusted under 35 U.S.C. 154(b) by 37 days.

(21) Appl. No.: 15/509,677

(22) PCT Filed: Sep. 10, 2015

(86) PCT No.: PCT/IB2015/056916
§ 371 (c)(1),
(2) Date: Mar. 8, 2017

(87) PCT Pub. No.: WO2016/038558
PCT Pub. Date: Mar. 17, 2016

(65) Prior Publication Data
US 2017/0241142 A1   Aug. 24, 2017

(30) Foreign Application Priority Data

Sep. 12, 2014   (NZ) ........................................ 631262

(51) Int. Cl.
*E04F 11/032* (2006.01)
*E04F 11/02* (2006.01)
(Continued)

(52) U.S. Cl.
CPC ............ *E04F 11/032* (2013.01); *A01K 1/035* (2013.01); *A01K 15/02* (2013.01);
(Continued)

(58) Field of Classification Search
CPC ... E04F 11/0201; E04F 11/032; E04F 11/035; E04F 11/038; E04F 11/1041; A01K 1/035; A01K 15/02
See application file for complete search history.

(56) References Cited

U.S. PATENT DOCUMENTS

| 52,922 A | * | 2/1866 | Widmayer | ............ | E04F 11/032 |
| | | | | | 52/187 |
| 432,599 A | * | 7/1890 | Clarke | .................. | E04F 11/032 |
| | | | | | 52/187 |

(Continued)

FOREIGN PATENT DOCUMENTS

| DE | 2501766 A1 | * | 7/1976 | ............ E04F 11/032 |
| DE | 2520628 A1 | * | 11/1976 | ............ E04F 11/032 |
| DE | 2853651 A1 | * | 7/1980 | ............ E04F 11/035 |

OTHER PUBLICATIONS

DE-2501766-A1 Machine Translation (Year: 2018).*
DE-2520628-A1 Machine Translation (Year: 2018).*
DE-2853651-A1 Machine Translation (Year: 2018).*

*Primary Examiner* — James M Ference
(74) *Attorney, Agent, or Firm* — Dann, Dorfman, Herrell and Skillman, P.C.

(57) ABSTRACT

A kit of parts for securing a plurality of fixtures to an elongate support member is described. The kit of parts comprises a plurality of attachment members. Each attachment member comprises an aperture for receiving the elongate support member and a fixing detail adapted to attach a fixture to the attachment member. The aperture is larger than a lateral dimension of the elongate support member to provide a gap between the attachment member and elongate support member when received in the aperture. The kit of parts also comprises a plurality of locking elements. Each locking element is adapted to be received in the aperture in the gap between the attachment member and the elongate (Continued)

support member to secure the attachment member to the elongate support member by friction. Further, each attachment member is adapted to engage an adjacent attachment member when secured to the elongate support member by at least one said locking element to form a hollow column secured around the elongate support member for supporting a plurality of fixtures.

20 Claims, 19 Drawing Sheets

(51) Int. Cl.
| | | |
|---|---|---|
| *E04F 11/035* | (2006.01) | |
| *E04F 11/038* | (2006.01) | |
| *E04F 11/104* | (2006.01) | |
| *A01K 1/035* | (2006.01) | |
| *A01K 15/02* | (2006.01) | |

(52) U.S. Cl.
CPC ........ *E04F 11/0201* (2013.01); *E04F 11/035* (2013.01); *E04F 11/038* (2013.01); *E04F 11/1041* (2013.01)

(56) References Cited

U.S. PATENT DOCUMENTS

| | | | | |
|---|---|---|---|---|
| 750,998 A * | 2/1904 | Ohnstrand | ............ | E04F 11/032 193/12 |
| 1,215,352 A * | 2/1917 | Dubinage | ............ | E04F 11/032 52/187 |
| 1,361,918 A * | 12/1920 | Smith | ............ | E04F 11/032 52/187 |
| 1,726,133 A * | 8/1929 | Wilson | ............ | E04F 11/032 52/187 |
| 3,667,176 A * | 6/1972 | MacKay | ............ | E04F 11/032 52/187 |
| 3,673,752 A * | 7/1972 | Allen | ............ | E04F 11/032 52/187 |
| 3,740,906 A * | 6/1973 | Schneider | ............ | E04F 11/032 52/187 |
| 3,916,591 A * | 11/1975 | Agterhof | ............ | E04F 11/032 52/187 |
| 4,041,662 A * | 8/1977 | Ward | ............ | E04F 11/038 52/182 |
| 4,128,976 A * | 12/1978 | Classen | ............ | E04F 11/032 52/187 |
| 4,338,751 A * | 7/1982 | Sanders | ............ | E04F 11/032 52/187 |
| 4,413,460 A * | 11/1983 | Gerlach | ............ | E04F 11/104 52/741.2 |
| 4,438,608 A * | 3/1984 | Hamm | ............ | E04F 11/032 52/187 |
| 4,527,367 A * | 7/1985 | Morellini | ............ | E04F 11/032 52/187 |
| 4,587,780 A * | 5/1986 | Rorke | ............ | E04F 11/032 182/92 |
| 4,655,017 A * | 4/1987 | Bond | ............ | E04F 11/032 52/187 |
| 4,722,374 A * | 2/1988 | Bond | ............ | E04F 11/032 144/3.1 |
| 5,088,248 A * | 2/1992 | Manna | ............ | E04F 11/032 52/183 |
| 5,515,657 A * | 5/1996 | Chou | ............ | E04F 11/032 182/194 |
| 5,535,557 A * | 7/1996 | Garber | ............ | E04F 11/032 52/182 |
| 5,720,136 A * | 2/1998 | Turner | ............ | E04F 11/02 52/182 |
| 5,772,356 A * | 6/1998 | Collins | ............ | E04B 1/185 248/188.4 |
| 5,829,390 A * | 11/1998 | Jonilla | ............ | A01K 15/024 119/706 |
| 5,983,580 A * | 11/1999 | Carr | ............ | E04F 11/032 52/182 |
| 6,108,988 A * | 8/2000 | Nagelski | ............ | A63B 9/00 182/48 |
| 6,490,997 B1 * | 12/2002 | Biermann | ............ | A01K 15/024 119/706 |
| 6,523,310 B1 * | 2/2003 | Tseng | ............ | E04F 11/032 52/182 |
| 6,618,953 B2 * | 9/2003 | Izumi | ............ | E04H 12/2284 248/514 |
| 8,056,288 B2 * | 11/2011 | Denicolo' | ............ | E04F 11/1043 52/126.7 |
| 8,534,234 B2 * | 9/2013 | Moore | ............ | A01K 1/035 119/847 |
| 2004/0079297 A1 * | 4/2004 | Wolfington | ............ | A01K 1/035 119/849 |
| 2004/0244724 A1 * | 12/2004 | Runge | ............ | A01K 1/035 119/847 |
| 2005/0284043 A1 * | 12/2005 | Sorenson, Jr. | ............ | E04F 11/025 52/182 |
| 2007/0000191 A1 * | 1/2007 | Arnold | ............ | E04F 11/032 52/187 |
| 2007/0144084 A1 * | 6/2007 | Barry | ............ | B27M 3/12 52/187 |
| 2007/0289556 A1 * | 12/2007 | Hoffman | ............ | A01K 1/035 119/847 |
| 2008/0236066 A1 * | 10/2008 | Arnold | ............ | E04F 11/032 52/187 |
| 2009/0056245 A1 * | 3/2009 | Miller | ............ | E04F 11/035 52/188 |
| 2011/0192099 A1 * | 8/2011 | Driscoll | ............ | E04F 11/032 52/187 |
| 2017/0241142 A1 * | 8/2017 | Catt | ............ | E04F 11/032 |

* cited by examiner

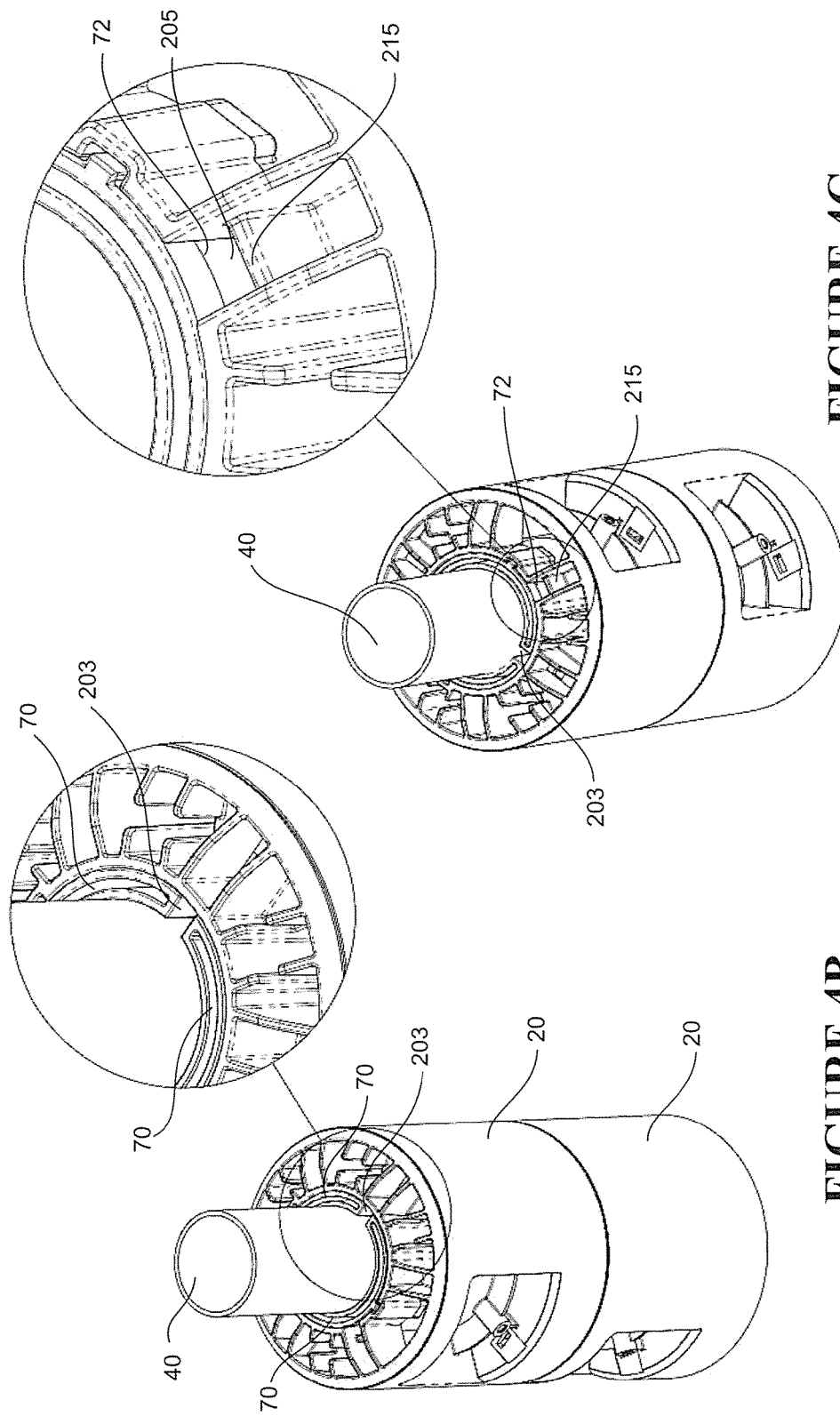

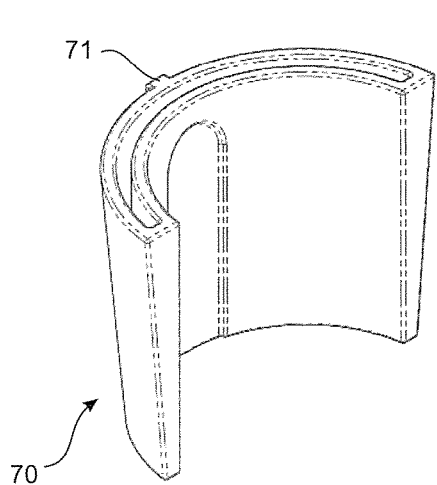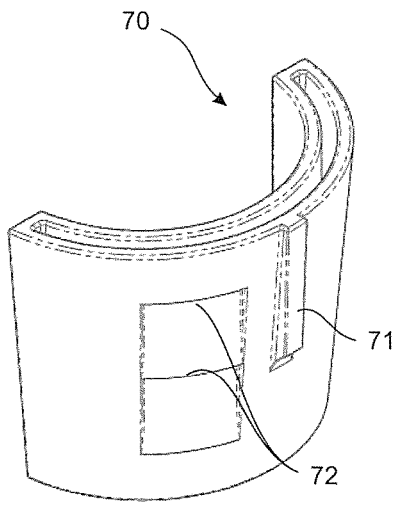
FIGURE 5A   FIGURE 5B
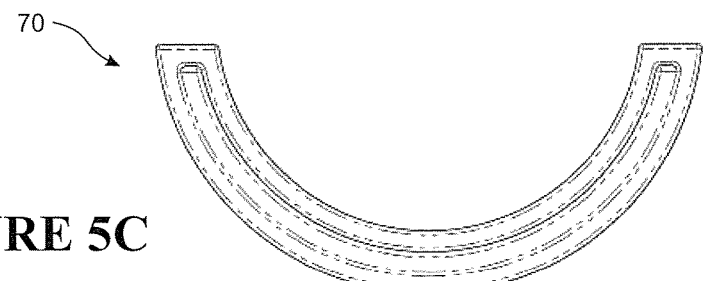
FIGURE 5C
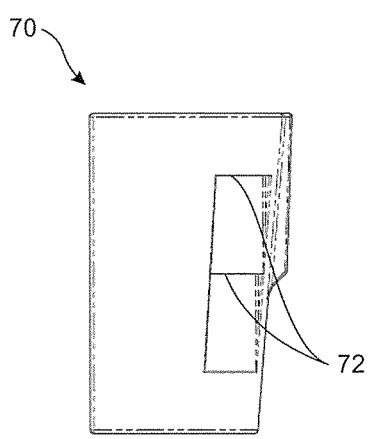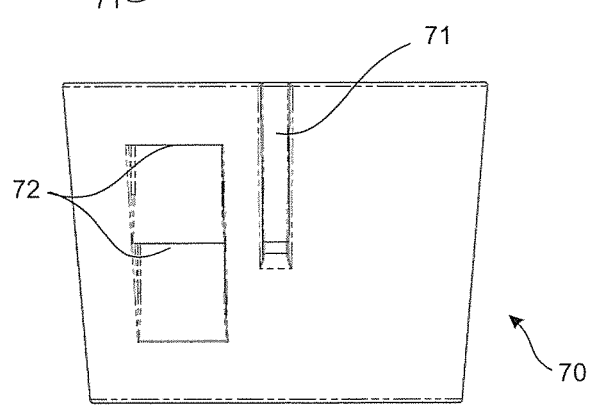
FIGURE 5D   FIGURE 5E

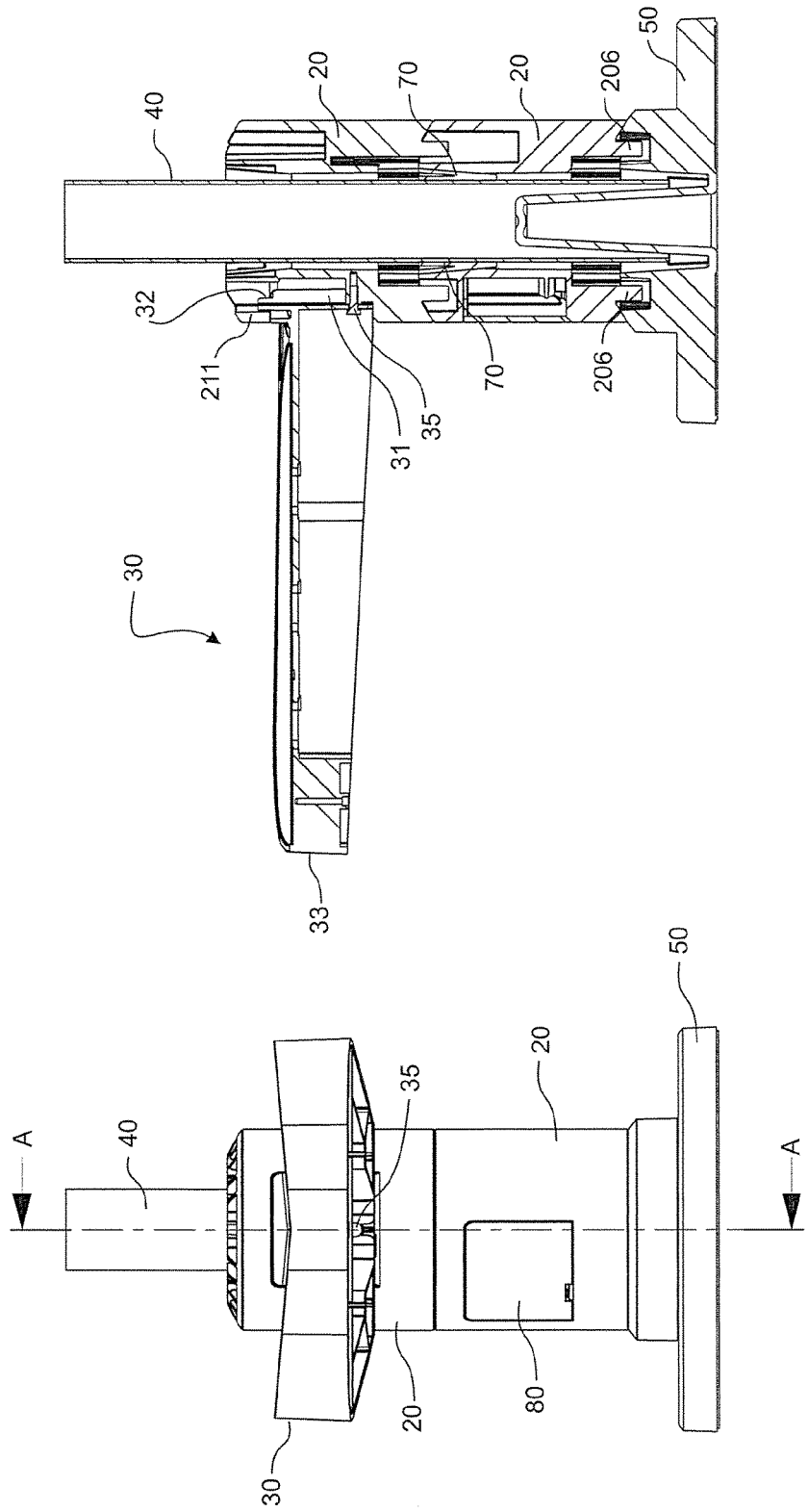

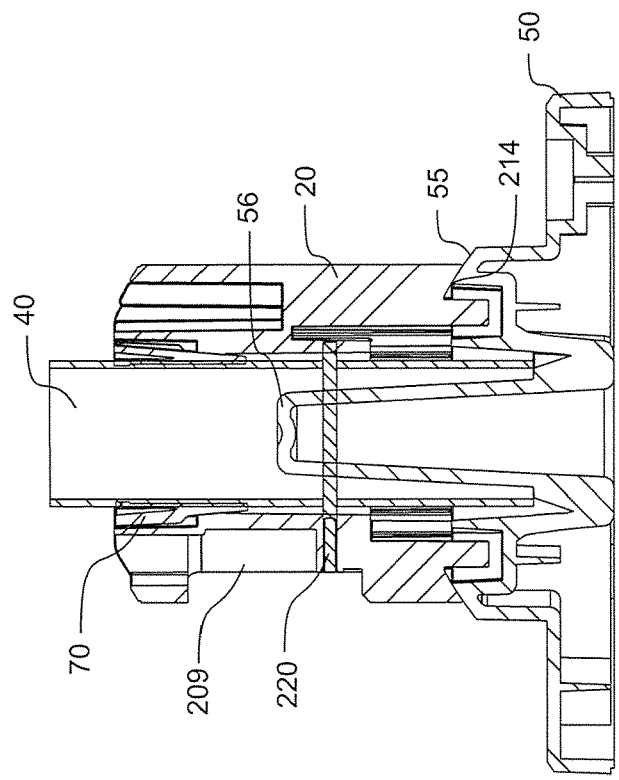
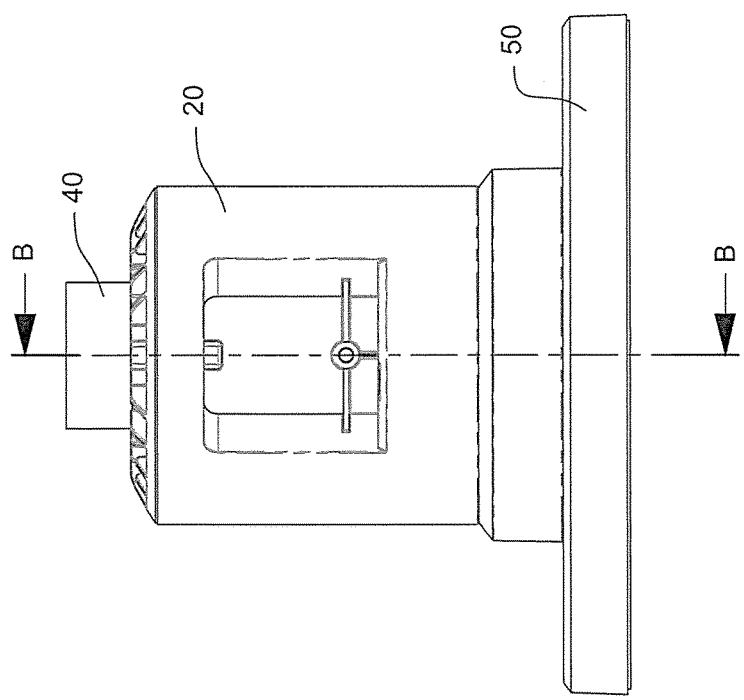
FIGURE 9B
FIGURE 9A

KIT OF PARTS FOR MODULAR STAIRCASE

FIELD OF THE INVENTION

The present invention relates to a kit of parts for building a staircase, a modular staircase, and more generally, a kit of parts for securing a plurality of fixtures to an elongate support member.

BACKGROUND TO THE INVENTION

Spiral staircases are well known. A spiral staircase has steps supported by a central column, the steps winding upwards around the central column in a helical fashion. Spiral staircases can be very efficient in the use of floor area and are therefore typically used in installations where floor area is restricted.

A spiral staircase, like any staircase, is typically designed for a particular installation height and space to ascend from a first level at a base of the staircase to a second level at the top of the staircase. To fit a particular space, a customised spiral staircase has a number of steps spaced apart at a particular step height and each step is angularly offset relative to a previous step by a particular amount. A staircase comprising a particular step height and angular offset between steps designed for one installation may not be suitable for another installation having a different installation height. Furthermore, for each installation, a customised support column may be required. For example, a support column with fixtures at the correct positions around the column must be fabricated to support steps at the correct heights to suit a particular installation.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide a staircase or a kit of parts for building a staircase that overcome one or more of the above mentioned disadvantages, or to provide a kit of parts for securing a fixture such as a step or other fixture to an elongate support member, or to at least provide the public with a useful choice.

SUMMARY OF THE INVENTION

In one aspect, the present invention consists in a package or kitset or kit of parts (herein a kit of parts) for securing a plurality of fixtures to an elongate support member comprising:
  a plurality of attachment members, each attachment member comprising:
    an aperture for receiving the elongate support member, the aperture being larger than a lateral dimension of the elongate support member to provide a gap between the attachment member and elongate support member when received in the aperture, and
    a fixing detail adapted to attach a fixture to the attachment member,
  a plurality of locking elements, each locking element adapted to be received in the aperture in the gap between the attachment member and the elongate support member to secure the attachment member to the elongate support member by friction,
  each attachment member adapted to engage an adjacent attachment member when secured to the elongate support member by at least one said locking element to form a hollow column secured around the elongate support member for supporting a plurality of fixtures.

In some embodiments the locking element is a wedge.

In some embodiments the aperture is circular for receiving an elongate support member with a circular cross section, the inner diameter of the aperture being greater than the outer diameter of the elongate support member to provide an annular gap between the attachment member and the elongate support member when received in the aperture, and
  the locking element is a curved locking element to fit in the annular gap between the attachment member and the elongate support member to secure the attachment member to the elongate support member by friction.

In some embodiments the locking element is a curved wedge to fit around the outside diameter of the elongate support member. In some embodiments the curved wedge is adapted to deform elastically to fit about a range of different diameter elongate support members, the kit of parts adapted to secure a fixture to a range of different diameter elongate support members. In some embodiments the kit of parts comprises two or more curved wedges, in use the curved wedges located side-by-side around the perimeter of the aperture in the gap between the attachment member and the elongate support member. In some embodiments the curved wedges have a circumferential length extending less than 180 degrees such that a gap remains between adjacent curved wedges when securing the attachment member to the elongate support member.

In some embodiments the locking element or attachment member comprises a key and the other one of the locking element or attachment member comprises a corresponding keyway, the key and keyway aligned with a longitudinal axis of the aperture and elongate support member.

In some embodiments at least one said locking element comprises at least one lateral shoulder in an outer surface of the locking element for engaging a tool to lever the locking element out of the gap between the attachment member and the elongate support member. In some embodiments said locking element comprises two or more lateral shoulders in the outer surface of the locking element spaced apart along the locking element.

In some embodiments the locking element or attachment member comprises a key and the other one of the locking element or attachment member comprises a corresponding keyway, the key and keyway aligned with a longitudinal axis of the aperture and elongate support member, and
  the attachment member comprises a recess or port providing access to the lateral shoulder of the locking element, angular alignment of the lateral shoulder and the port or recess achieved by engagement between the key and keyway.

In some embodiments the fixing detail comprises a recess in an outer surface of the attachment member, a top portion of the recess covered by a wall portion of the attachment member for receiving an upwardly extending member of a fixture to be fitted to the attachment member. In some embodiments the fixing detail comprises a fastener hole within the recess to secure a fixture fitted to the attachment member.

In some embodiments the attachment member has a recess for receiving an end of a said locking element extending from an adjacent said attachment member.

In some embodiments the attachment member comprises:
protrusions or openings at one end of the attachment member spaced circumferentially around the aperture, and
corresponding openings or protrusions at the other end of the attachment member spaced circumferentially around the aperture,
the protrusions and openings adapted to engage corresponding openings or protrusions on an adjacent said attachment member secured to the elongate support member.

In some embodiments the protrusions and openings are arranged to determine an angular relative position between adjacent said attachment members. In some embodiments there are 4, or 5, or 6, or 7, or 8, or 9, or 10, or 11, or 12, or 13, or 14, or 15, or 16, or more openings. In some embodiments there are more openings than protrusions. In some embodiments there are twice as many openings as protrusions.

In some embodiments the attachment member and the locking element are adapted to secure the attachment member to an elongate support member having an outer diameter of 30 mm to 50 mm, or 35 mm to 45 mm, or 40 mm to 45 mm.

In some embodiments the attachment member and locking element are adapted to secure to a standard size pipe, the standard size pipe forming the elongate support member.

In some embodiments the kit of parts comprises a plurality of fixtures to attach to the attachment member by the fixing detail, wherein the fixing detail of the attachment member comprises a recess in an outer surface of the attachment member, a top portion of the recess covered by a wall portion of the attachment member, and
each fixture comprises an upwardly extending member adapted to extend into the recess and bear against an inner surface of the wall portion to fit the fixture to the attachment member, and
the upwardly extending member is weaker than the wall portion so that the fixture breaks away from the column without substantial damage to the column when exposed to an excessive load.

In some embodiments the kit of parts comprises a plurality of fixtures to attach to the attachment member by the fixing detail, wherein each fixture is a hook for hanging an item from the column.

In some embodiments the kit of parts comprises a plurality of fixtures to attach to the attachment member by the fixing detail, wherein each fixture is a step, the kit of parts when assembled to the elongate support member forming a staircase.

In some embodiments each step comprises a fixing detail for attaching the step to a vertical surface.

In some embodiments the kit of parts comprises one or more covers, each cover adapted to cover the fixing detail on a said attachment member.

In some embodiments the kit of parts comprises a base, the base comprising a recess or aperture for receiving an end of the elongate support member, an upper end of the base adapted to engage a said attachment member to be secured to the elongate support member above the base, and a bottom end of the base adapted to fix the base to a floor or ground surface.

In some embodiments the base comprises a post extending from the recess to be received in a hollow bore of the elongate support member. In some embodiments the base comprises a flange and fastener holes in the flange for securing the base to a floor or ground surface.

In some embodiments, the base is a base assembly adapted to be adjusted from a perpendicular configuration for use on a level floor surface to a tilted configuration for use on a sloping floor surface with the hollow column vertical.

In some embodiments, the base assembly comprises a bottom component and a top component, the top and bottom components adapted to be rotationally fitted together to rotate relative to one another, the bottom component having a sloping upper surface and the top component having a corresponding sloping bottom surface, such that relative rotation between the bottom and top components adjusts the base assembly between the perpendicular configuration and the tilted configuration.

In some embodiments, the base assembly is adapted to allow for a sloping floor angle of at least 2 degrees, or at least 3 degrees, or at least 4 degrees, or at least 5 degrees, or of between 0 degrees and about 4 degrees.

In some embodiments an upper surface of the base and a lower surface of a said attachment member are complementary adapted to allow for misalignment between an axis of the base and an axis of the attachment member. In some embodiments an upper surface of the base and a lower surface of a said attachment member are complementary adapted to form a ball joint.

In some embodiments the upper surface of the base and a lower surface of a said attachment member are complementarily adapted to allow for angular misalignment of at least 2 degrees, or at least 3 degrees, or at least 4 degrees, or at least 5 degrees, or about 3 degrees.

In some embodiments the kit of parts comprises a cap component adapted to attach to an upper end of a said attachment member. In some embodiments the cap comprises two or more hooks and each attachment member comprises two or more corresponding holes for receiving said hooks for securing the cap the upper end of the attachment member.

In a second aspect, the present invention consists in a package or kitset or kit of parts (herein a kit of parts) for building a staircase around a vertical elongate support member comprising:
a plurality of attachment members, each attachment member comprising:
an aperture for receiving the elongate support member, the aperture being larger than a lateral dimension of the elongate support member to provide a gap between the attachment member and the elongate support member when received in the aperture, and
a fixing detail,
a plurality of locking elements, each locking element adapted to be received in the aperture in the gap between a said attachment member and the elongate support member to secure the attachment member to the elongate support member by friction,
each attachment member adapted to engage an adjacent said attachment member when secured to the elongate support member by said at least one locking element to form a hollow column secured around the elongate support member, and
a plurality of steps, each step adapted to be attached to a said attachment member via the fixing detail of the attachment member.

In some embodiments of the first or second embodiment, the kit of parts may include instructions for use and/or assembly of the kit of parts.

In a third aspect, the present invention consists in a modular staircase comprising:
a vertical elongate support member,
a plurality of attachment members fitted to the vertical elongate support member, each attachment member comprising:
an aperture for receiving the elongate support member, the aperture being larger than a lateral dimension of the elongate support member to provide a gap between the attachment member and the elongate support member when received in the aperture, and
a fixing detail,
a plurality of locking elements, each locking element received in the aperture in the gap between a said attachment member and the elongate support member to secure the attachment member to the elongate support member by friction, each attachment member engaging an adjacent said attachment member to form a hollow column secured around the elongate support member, and
a plurality of steps, each step attached to a said attachment member via the fixing detail of the attachment member.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will be described by way of example only and with reference to the drawings.

FIG. 3A is a top view, FIG. 3B is a front view, FIG. 3C is a side view, FIG. 3D is a perspective view from above, and FIG. 3E is a perspective view from below.

FIGS. 4A to 4C illustrate two attachment members and locking elements for securing a said attachment member to an elongate support member. FIG. 4A shows the locking elements prior to insertion into a gap between the elongate support member and the attachment member. FIG. 4B shows the attachment members and locking elements installed in the gap. FIG. 4C shows the assembly of FIG. 4B from a different angle to highlight a port or recess levering the locking element out of the gap.

FIGS. 5A to 5E illustrate a locking element that is a curved wedge. FIG. 5A is a perspective view showing an inner side of the wedge. FIG. 5B is a perspective view showing an outer side of the wedge. FIG. 5C is a top view, FIG. 5D is a side view, and FIG. 5E is a front view.

FIG. 6A is a perspective view from above from an outer end, FIG. 6B is a perspective view from above from an inner end, and FIG. 6C is a perspective view from below.

FIGS. 7A and 7B illustrate a bottom portion of the staircase of FIG. 1. FIG. 7A is a side view and FIG. 7B is a cross sectional view on arrows A-A in FIG. 7A.

FIG. 8A is a perspective view from above, FIG. 8B is a top view, and FIG. 8C is a side view.

FIGS. 9A to 9C illustrate a bottom portion of the staircase of FIG. 1. FIG. 9A is a side view, FIG. 9B is a cross sectional view on arrows B-B in FIG. 9A, FIG. 9C is the same side view as FIG. 9A but with an axis of an attachment member at an angle to an axis of the base of the staircase.

FIG. 10A is a perspective view showing a back side of the cover, FIG. 10B is a perspective view showing a front side of the cover, FIG. 10C is a top view, FIG. 10D is a back view, FIG. 10E is a bottom view, and FIG. 10F is an end view.

FIG. 11A is a side view, FIG. 11B is a second side view, FIG. 11C is a perspective view from above, FIG. 11D is a bottom view, and FIG. 11E is a perspective view from below.

FIG. 14A is a cross sectional view of the base assembly of FIG. 13 with the base oriented in a horizontal configuration, and FIG. 14B is a cross sectional view of the base assembly of FIG. 13 with the base oriented in a tilted or sloping configuration.

FIG. 15A is a side view and FIG. 15B is a cross sectional view on arrows B-B in FIG. 15A.

DETAILED DESCRIPTION OF PREFERRED EMBODIMENTS

The present invention is described by reference to preferred embodiments. In a preferred embodiment the present invention is a modular spiral staircase, or a kit of parts for building a modular staircase.

Figure 1:
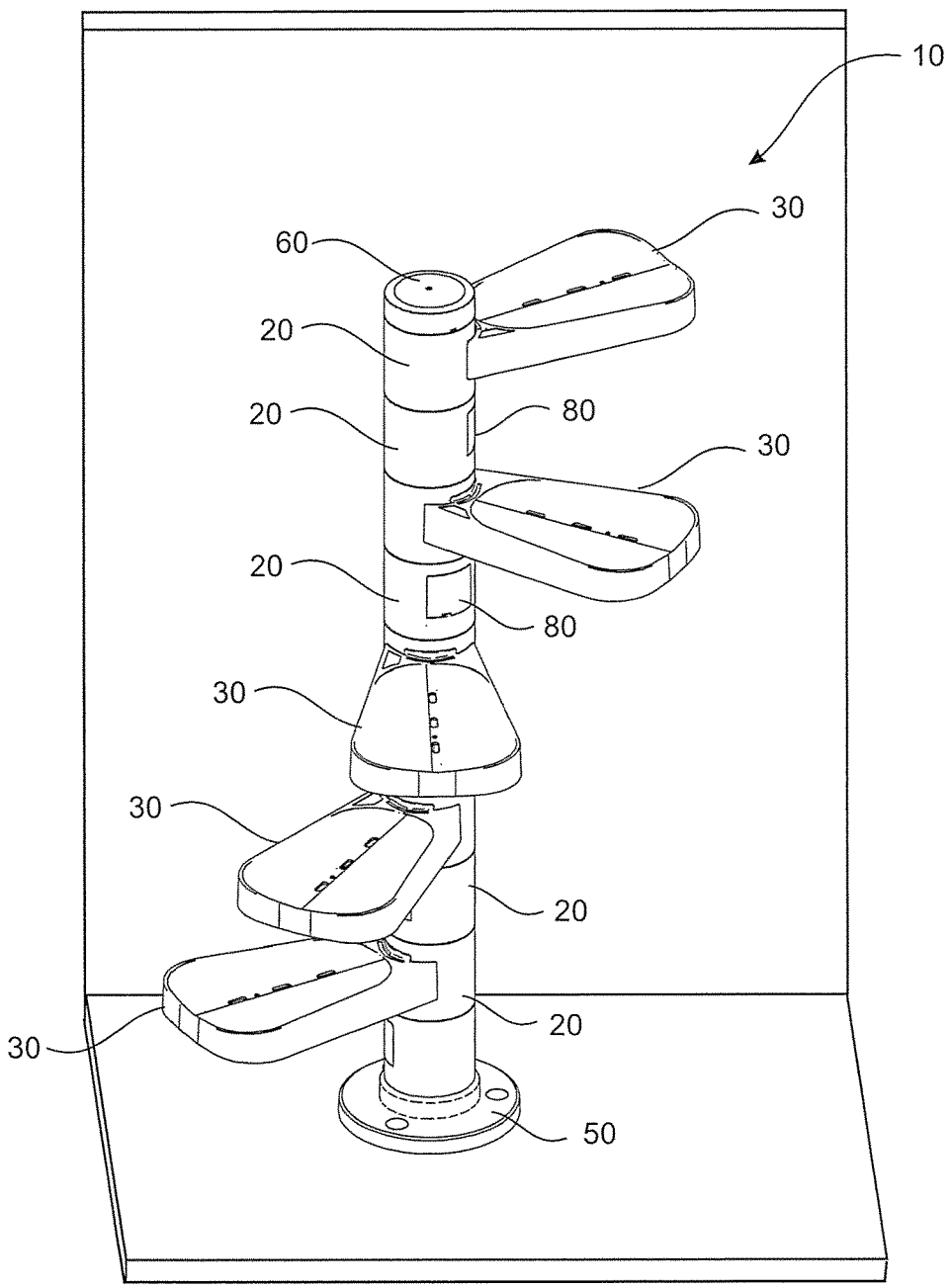
FIG. 1 is a perspective view of a pet staircase according to an embodiment of the present invention.

A modular staircase according to some embodiments of the present invention is illustrated in FIG. 1. The particular illustrated staircase is for use by pets, for example cats. However, a person skilled in the art will appreciate that inventive concepts embodied in the exemplary staircase may be applied in other staircases, for example for use by humans. Further, a person skilled in the art will appreciate that inventive concepts embodied in the exemplary staircase may be applied usefully in assemblies other than a staircase, as will be described below.

Figure 2:
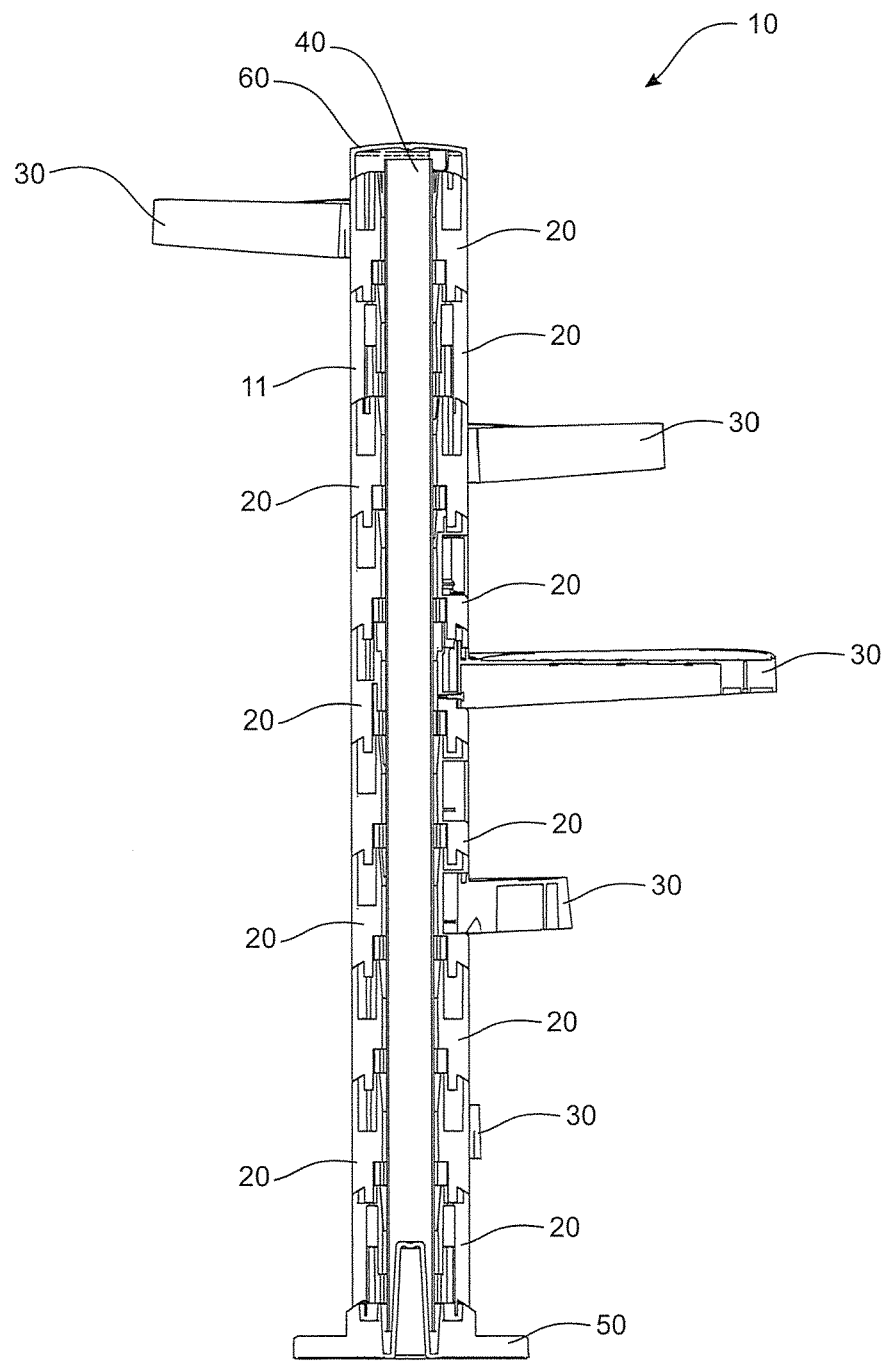
FIG. 2 is a cross sectional view of the staircase of FIG. 1.

The staircase of FIG. 1 provides a means for a pet to enter a building via for example a pet door that is elevated from a lower surface. The staircase 10 is built from a number of column spacers or attachment members 20. The attachment members attach steps 30 of the staircase to a central elongate support member. For example, a cross section view of the staircase of FIG. 1 is given in FIG. 2. The attachment members 20 are fitted about and secured to elongate support member 40. Each step is attached to the attachment member and is therefore secured to the elongate support member via an attachment member. The elongate support member forms a structural vertical component for supporting the staircase.

As the staircase is formed from a number of attachment members 20 and steps 30 the staircase is a modular staircase. The attachment members and steps together with other parts described below may form a kit of parts for building a modular staircase. In the illustrated example, the staircase comprises 10 attachment members and 5 steps. In some embodiments, the attachment member may have a height of about 100 mm, such that a staircase comprising 10 attachment members has a height of around 1 m. Many other attachment member heights and arrangements are possible. For example, to reduce the step height between steps a step may be attached to each attachment member in the staircase. Further, more or less attachment members and corresponding steps may be provided for a staircase, to provide a taller or shorter staircase. In a minimal form, a 'staircase' may comprise one attachment member 20 and one step 30. In some embodiments attachment members may have a height of 50 mm to 200 mm for example, and in some embodiments a number of attachment members of different heights may be provided to provide yet more configurability for constructing a stair case.

In some embodiments as illustrated the step 30 provides a surface suitable for a pet to step onto, to climb up the staircase. However, in some embodiments a step may be a post or other member to provide a climbing frame (for example to work as a 'gym') for an animal to climb, or a 'scratch post' that a pet may use for amusement or stretching. Thus in this specification and claims the word "step" should be interpreted to mean a member that an animal may claw or otherwise climb onto or hang from. The terms "climbing frame" and "staircase" may be used interchangeably. Thus a staircase may be used by a pet for the purpose of gaining access from one level to another level or for other purposes such as amusement or fitness.

The staircase or kit of parts may also comprise a base 50 for securing the staircase to a floor or ground surface, and a cap 60 for capping off the upper most attachment member 20.

Detailed aspects of the attachment members and locking elements for securing the attachment members to the elongate support member are now described.

With reference to FIGS. 3A to 3D and FIGS. 4A to 4C, the attachment member comprises an aperture or internal bore 201 through which the elongate support member is received.

Figure 4A:
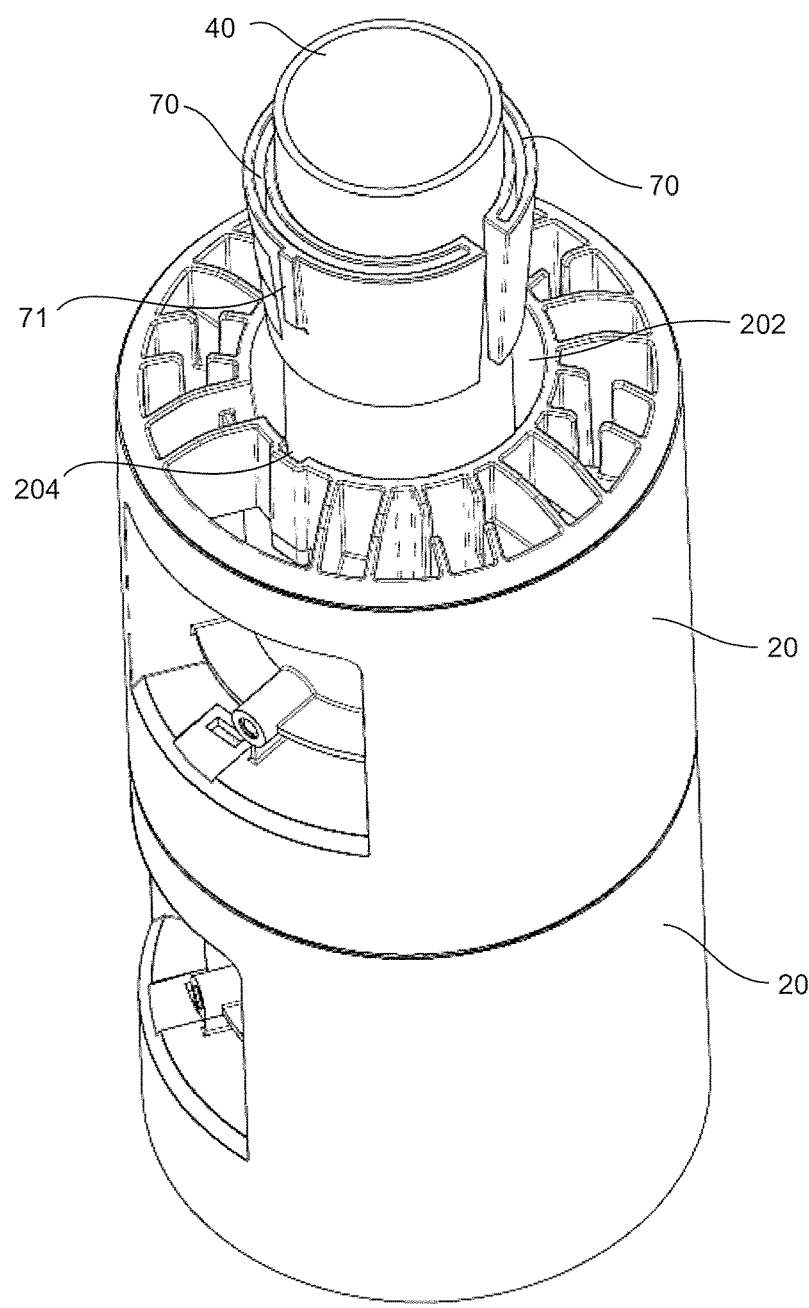

In FIGS. 4A to 4C the elongate support member is a length of pipe 40. Alternatively the elongate support member may be a rod or solid shaft.

The spiral staircase or kit of parts comprises at least one locking element for securing an attachment member to the elongate support member, which now may be referred to as a pipe by way of example. As shown in FIG. 4A, the aperture 201 for receiving the pipe is larger than a lateral dimension of the pipe to provide a gap 202 between the attachment member and the pipe when received in the aperture 201. For example, in the illustrated embodiment the aperture and pipe are both circular. The inner diameter of the aperture is greater than the outer diameter of the pipe so that an annular gap 202 is provided between the attachment member and the pipe. One skilled in the art will understand that the elongate support member and attachment member aperture need not be circular, for example the elongate member and corresponding attachment member aperture may be square or hexagonal or other shape.

To secure the attachment member to the pipe a locking element 70, as illustrated in FIG. 4A, is inserted into the aperture 201 in the gap 202 between the attachment member and the pipe. The locking element is sized appropriately to press tightly into the gap to secure the attachment member to the pipe by friction. The locking element does not penetrate the wall of the pipe. The locking element allows the attachment member to be secured to the pipe without requiring a fixing detail such as a fastener hole in the pipe. However, in some embodiments a fastener may be provided to further secure an attachment member to the elongate support member. For example, an installer may drill a hole in a wall of the elongate support member via for example fastener hole 212 (FIG. 3B) once the attachment member has been secured to the elongate support member by the locking element or elements. The installer would then insert a fastener (for example a screw or pin) into the hole 212 and drilled hole in the support member 40.

In a preferred embodiment the locking element is a wedge. In FIG. 4A, the wedge locking element is shown outside of the gap 202. A user may press or hammer the locking element tightly into the gap, as illustrated in FIG. 4B, to secure the attachment member 20 to the elongate support member 40.

Where the attachment member aperture 201 and elongate support member both have a circular cross section, in preferred embodiments the locking element is a curved locking element to fit in the annular gap between the attachment member and the elongate support member to secure the attachment member to the elongate support member by friction. Most preferably, as illustrated in FIG. 4A, the locking element is a curved wedge that fits around the outside diameter of the pipe. The curved wedge may be described as a 'taper lock'. A preferred curved wedge is illustrated in detail in FIGS. 5A to 5E.

In some embodiments the curved wedge is adapted to deform elastically to fit about a range of different diameter elongate support members. For example, the internal diameter of the curved wedge may be approximately equal to a mean diameter of a range of pipes that the attachment members are to be secured to. To secure the attachment members to a smaller diameter pipe in a range of pipes the curved wedge is deflected inwards to fit around the pipe outside diameter. To secure the attachment members to a larger diameter pipe in a range of pipes the curved wedge is deflected outwards to fit around the pipe outside diameter.

The wedge comprises a suitable amount of taper to accommodate the range of outside diameters of pipes within the aperture of the attachment member. For example, in FIG. 4B, in a secured position the wedges are hammered or pressed into the gap 202 until the wedge is flush with an upper end of the attachment member to grip or clamp the pipe within the attachment member. When securing the attachment member to a smaller pipe, the wedge may be installed in the gap to be recessed within the gap 202 below the end of the attachment member when gripping or clamping the pipe. In this arrangement, the wedge may need to be tapped into place with a narrow tool, for example a punch or screw driver. When securing the attachment member to a larger pipe, the wedge may be installed in the gap to extend beyond the end of the attachment member when gripping or clamping the pipe. Thus the locking element allows for a range of different sized elongate support members.

In some embodiments the staircase or kit of parts comprises two or more locking elements to be located side-by-side around the perimeter of the aperture in the gap between the attachment member and the elongate support member. For example, as shown in FIGS. 4A to 4D, in some embodiments there are two curved wedges for securing an attachment member to the elongate support member. Preferably the wedges have a circumferential length that extends less than 180 degrees so that a gap 203 remains between adjacent curved wedges when the wedges are in an installed position to secure the attachment member to the pipe, so that the adjacent wedges do not make contact when securing the attachment member to the elongate support member In preferred embodiments, the locking element or attachment member comprises a key and the other one of the locking element or attachment member comprises a corresponding keyway. For example, in the illustrated embodiment, the curved wedge 70 comprises a key 71, and the attachment member comprises a keyway 204. The key and keyway are aligned with a longitudinal axis of the aperture and elongate support member so that the key is correctly positioned in the gap between the pipe and the attachment member.

Preferably the taper of the wedge is located at an outer surface of the wedge. Preferably an inner surface of the wedge is parallel to the surface of the elongate support member. Preferably the perimeter wall of the aperture 201 of the attachment member is tapered to correspond to the taper of the wedge locking element, for example, as shown in FIG. 7B.

In order to sufficiently secure the attachment member to the elongate support member the locking element is tightly pressed into the space between the support member and the attachment member, in the aperture of the attachment member. In some instances, a user may wish to dismantle the staircase. To assist with removing the locking element from between the elongate support member and the attachment member, in some embodiments the locking element has at least one lateral shoulder in an outer surface of the locking element for engaging a tool. The shoulder may be used to lever the locking element out of the gap from between the attachment member and the elongate support member. In some embodiments, the locking element may comprise two or more lateral shoulders in the outer surface of the locking element spaced apart along the locking element, to accommodate different axial positions within the aperture 202 to account for different diameter elongate support members. For example, in the illustrated example of FIGS. 5A to 5E, the locking element may have two lateral shoulders 72. In the illustrated embodiment the lateral shoulder 72 is an upper edge of a recess formed in an outer surface of the wedge. However, in some embodiments, the wedge 70 may comprise a hole or slot in the wedge so that an upper edge of the hole or slot provides a shoulder against which a lever may act to lift the wedge from the aperture 201.

In some embodiments, the attachment member has a recess or port 205 providing access to the lateral shoulder of the locking element when the locking element is installed in the gap 202. The attachment member may have a fulcrum 215 adjacent the port or recess 205 for levering the locking element out via the lateral shoulder 72. Angular alignment of the lateral shoulder and the port or recess 205 may be achieved by a key and keyway of the attachment member and locking element as described above.

As described above, the attachment members are secured to the elongate support member such as a pipe without any attachment detailed provided to the pipe. This arrangement allows for any elongate member to be used as the support member for the staircase. For example, an attachment member may be sized to be suitable for attachment to a range of standard size pipes. Standard sized pipes are typically readily available and thus the present invention provides for a convenient and cost effective means for building a staircase. In some embodiments, a length of plastic waste pipe is a suitable elongate member for supporting the staircase. In a preferred embodiment the attachment member and locking element(s) are suitable for use with standard drain/waste/vent (DWV) pipes, as these pipes are commonly available in many hardware stores and are often supplied in meter lengths or can be easily cut to a required length. For example, in the exemplary embodiment the attachment member and locking element are adapted to be secured to an elongate support member with an outside diameter of between 40.3 mm to 43.1 mm to be suitable for use with:
    a plastic pipe according to the pipe standards listed below:
        AS/NZS 1260 DN40 PVC non-pressure pipe
        BS 1455-1 1.5" ABS waste pipe
        ASTM D2665-12. 1.25" PVC non-pressure pipe
        BS EN 1451 1.5" Polypropylene non-pressure pipe
        BS EN 1566 1.5" DN40 PVC-c waste pipe, and
    a D32 steel pipe according to the pipe standards listed below:
        ASME B36.10 standard series pipes
        BS 1387 (EN 10255) light series pipes
        ASTM A53.

The above choice of diameter is by way of example only, suitably chosen for a pet stair case as providing the requisite strength for this use. Such support members provide sufficient strength for supporting a pet staircase many meters in height, for example 3 m to 6 m or more in height. An attachment member and locking element suitable for other uses, for example a spiral staircase for human use may be adapted for other sized elongate members. In some embodiments, the attachment member and locking element are adapted to secure the attachment member to an elongate support member having an outer diameter in the range of 5 mm to 200 mm, or 10 mm to 100 mm, or 15 mm to 80 mm, or 20 mm to 60 mm, or 30 mm to 50 mm, or 35 mm to 45 mm, or 40 mm to 45 mm.

Preferably each attachment member is adapted to engage adjacent attachment members when fitted to the elongate support member so that the attachment members fitted to an elongate support member combine to form a hollow column 11 (FIG. 1) secured around the elongate support member.

In some embodiments, each attachment member has protrusions or openings at one end of the attachment member spaced circumferentially around the aperture, and corresponding openings or protrusions at the other end of the attachment member spaced circumferentially around the aperture. The protrusions and openings are adapted to engage corresponding openings or protrusions on an adjacent said attachment member secured to the elongate support member.

Figure 3A:
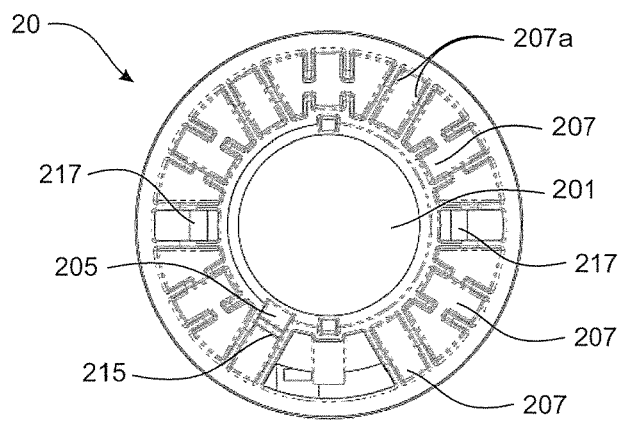
FIGS. 3A to 3E illustrate an attachment member for the staircase of FIG. 1.
Figure 3B:
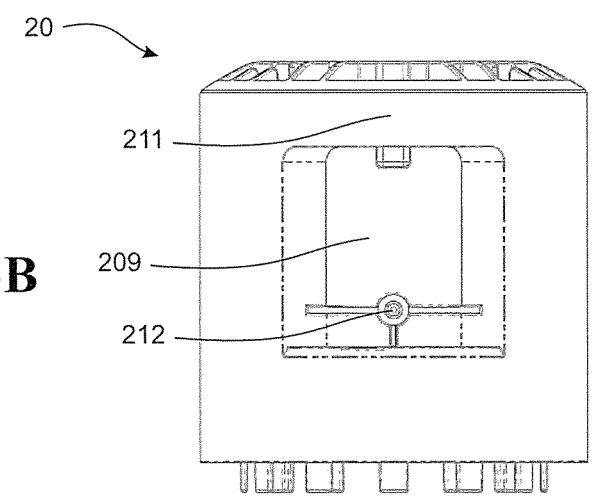
Figure 3C:
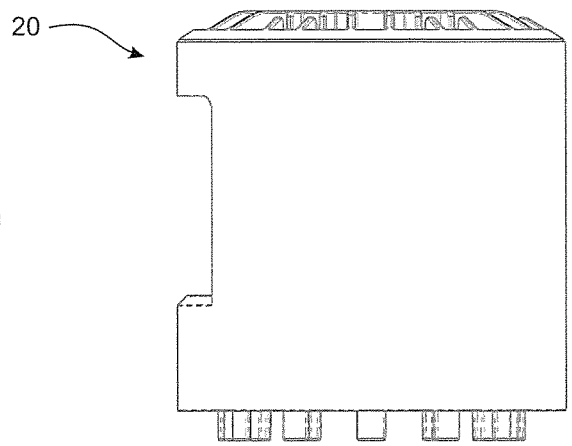
Figure 3D:
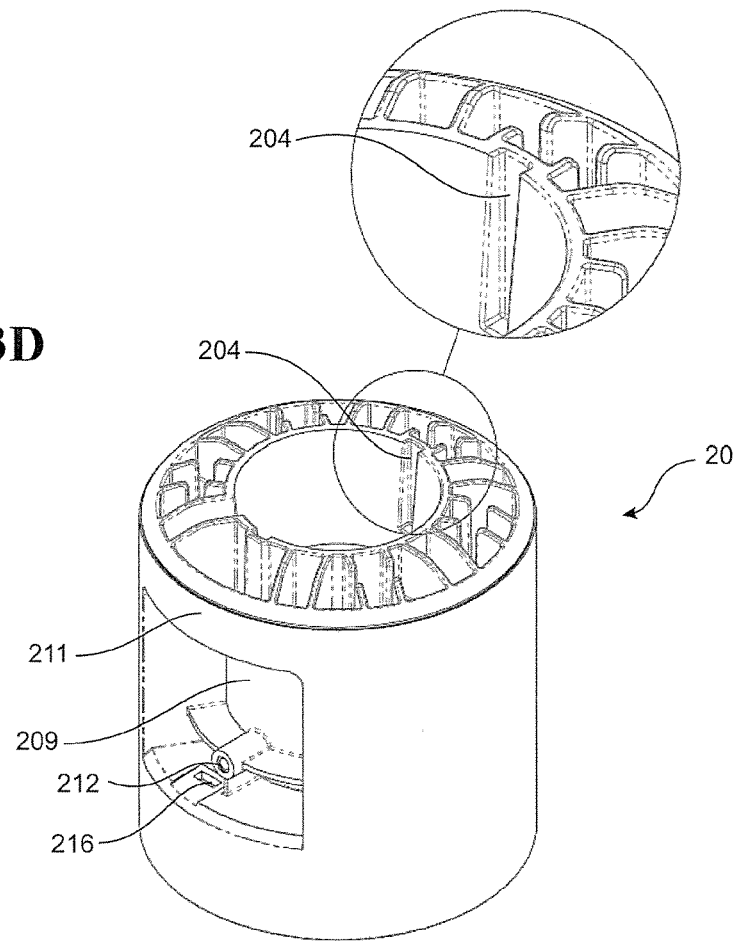
Figure 3E:
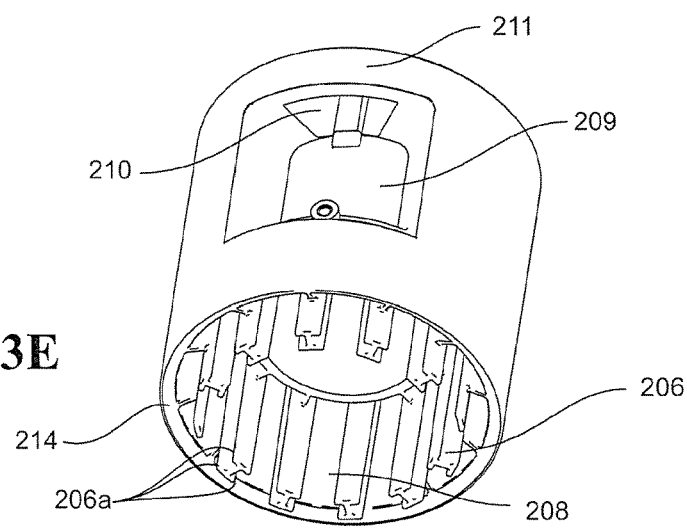

For example, in the illustrated embodiment each attachment member comprises a number of projections 206 extending from a bottom end as shown in FIG. 3E and corresponding openings 207 at an upper end as shown in FIG. 3A. Circumferentially facing surfaces 206a of the projections 206 may bear against circumferentially facing surfaces 207a of the openings 207, to correctly align adjacent attachment members in a lateral direction when assembled onto the elongate support member. The protrusions and openings determine an angular relative position between adjacent said attachment members, so set the relative angular positions of the steps of the spiral staircase. In the illustrated example each attachment member 20 has 12 projections and corresponding openings for accepting the projections of an adjacent member. Therefore the projections and openings allow the angular relative positions between adjacent attachment members to be set in increments of 30 degrees. However, in some embodiments there may be more or less projections and corresponding openings, for example 4, or 5, or 6, or 7, or 8, or 9, or 10, or 11, or 12, or 13, or 14, or 15, or 16, or more openings. In some embodiments there are more openings 207 than protrusions 206. For example, with reference to the illustrated embodiment there may be 12 openings and 6 projections.

Figure 12A:
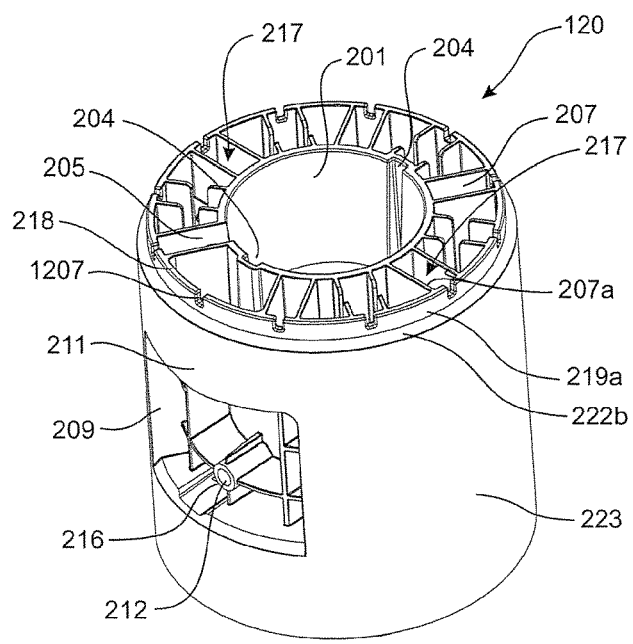
FIGS. 12A and 12B illustrate an alternative attachment member to the attachment member illustrated in FIGS. 3A to 3E. The attachment member of FIGS. 12A and 12B is similar to the member of FIGS. 3A to 3E.
Figure 12B:
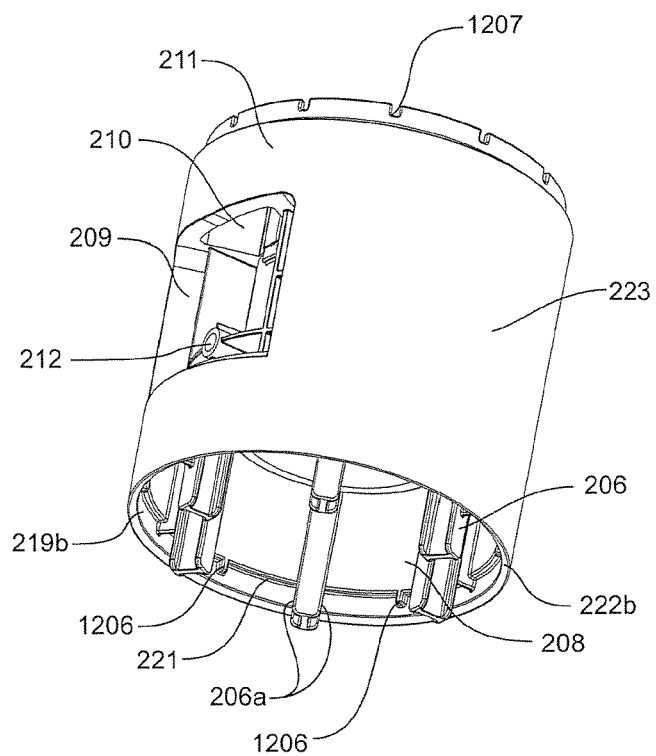

FIGS. 12A and 12B illustrate an alternative attachment member 120. The attachment member 120 is very similar to the attachment member 20 of FIGS. 3A to 3E, and shares many of the same features described above with reference to FIGS. 3A to 4C, as indicated by the same reference numerals used in FIGS. 3A to 3E and FIGS. 12A and 12B. In the embodiment of FIGS. 12A and 12B, the projections 206 and openings 207 are a first set of projections and openings. The attachment member 120 also comprises a second set of projections 1206 and openings 1207. In the illustrated embodiment, the first set of projections and openings comprises six projections 206 and twelve openings 207. The second set of projections and openings comprises twelve projections 1206 and twelve openings 1207. The openings 1207 are formed as notches 1207 in a top facing edge or surface 218 of the attachment member. Each projection 1206 may be formed as a radial projection or rib at an inward-facing circumferential surface adjacent a bottom end of the attachment member. The projections 206 and corresponding openings 207 may rotationally lock base assembly to the attachment member. The projections 1206 and corresponding openings 1207 may rotationally lock base assembly to the attachment member. The first set of projections extend beyond a bottom end of the attachment member, and may be used to align the attachment member to the top of another attachment member or to the top of a base part of the assembly 10. Due to the length of the projections extending from a surface within a recess 208 of the member, flex in the projections 207 may result in some relative rotation between adjacent attachment members when the projections are received in the openings. The second set of projections 1206 are preferably rigid (and so do not flex) so that the second set of projections 1206 and openings 1207 securely lock adjacent attachment members together against relative rotation about a longitudinal axis of the attachment members.

In some embodiments a top portion of the attachment member 120 fits within a recess in the bottom of an adjacent attachment member so that a radially outwardly facing circumferential surface 219a at the top of the attachment member bears against or faces a radially inwardly facing circumferential surface 219b at the bottom of an adjacent attachment member, to align the attachment members laterally and assist with maintaining a straight column 11. Also, the projections 206, 1206 and corresponding openings 207, 1207 are located radially within an outer wall surface of the attachment member 20, 120 so that when attachment members are fitted together the projections 206, 1206 and corresponding openings 207, 1207 are hidden from view.

The illustrated embodiment of FIG. 1 shows a spiral staircase configuration. However, it is apparent that by altering the angular positions of the steps fitted to the hollow column, a staircase other than of a spiral form may be built. For example, a staircase may be arranged adjacent a flat wall, with adjacent steps alternating from side to side along the hollow column. In other configuration, the staircase may be arranged in a corner formed by two adjoining walls, the steps moving back and forth around the hollow column within a 90 degree span around the column. In other configurations the steps may be arranged in a random fashion up the column 11, to for example provide a climbing frame or gymnasium for a pet.

Figure 15A:
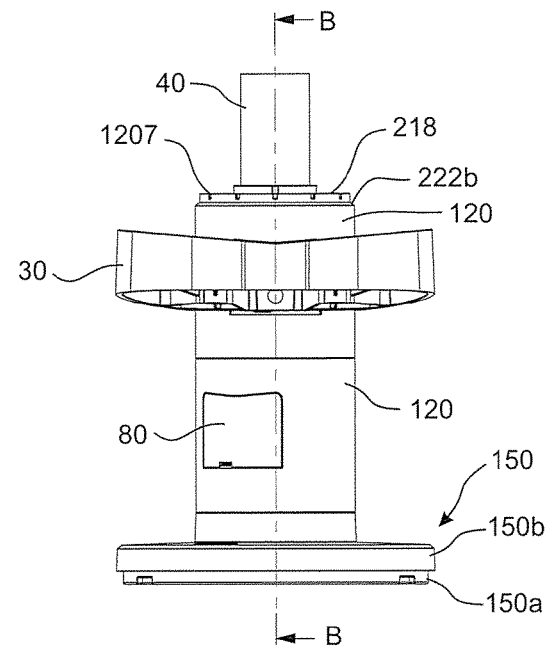
FIGS. 15A and 15B illustrate a bottom portion of a staircase utilizing the attachment member as shown in FIGS. 12A and 12B, and the base assembly of FIG. 13.
Figure 15B:
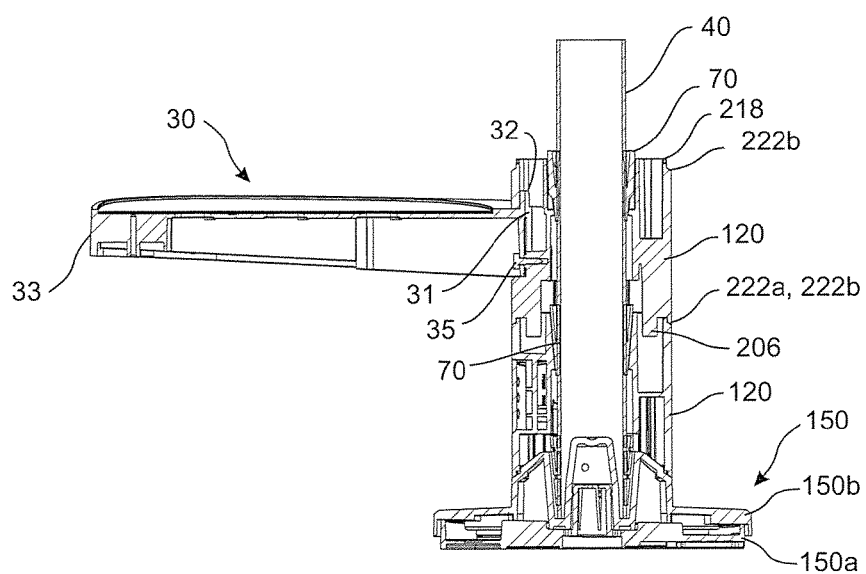

The axial relative position of attachment members is set by one axial end or surface of an attachment member bearing against an axial end or surface of an adjacent attachment member. For example, with reference to FIGS. 12A and 12B, axial surface 218 at the top of the attachment member may bear against axial surface 221 at the bottom of an adjacent attachment member. The axial bearing surfaces 218, 221 may be located at a radial distance from an outer surface 223 of the attachment member. The attachment member may also have an outer upwardly facing annular surface 222a at the top end of the attachment member that slopes downwardly away from surface 219a. The bottom end of the attachment member has a corresponding outer downwardly facing annular surface 222b, sloping downwards from surface 219b. The downward slope of surfaces 222a and 222b may help to prevent water running down an outer wall 223 of the attachment member from entering an inside of the assembled column 11. In some embodiments the axial surfaces 222a, 222b of adjacent members 20 bear against one another when assembled together to form the hollow column 11. The annular surfaces 222a, 222b provide a downwardly sloping interface between adjacent attachment members, at an outer circumference of the column 11, as illustrated in FIG. 15B.

In some embodiments, the attachment members each have a recess or space 208 for accommodating an end of a locking element 70 extending from an adjacent said attachment member. For example, where the locking element 70 extends from the aperture 201 of an attachment member due to the size of the elongate support member, the end of the locking element is received in a space 208 in the base of an adjacent attachment member.

In some embodiments not all attachment members are required to be secured to the elongate support member. For example, alternate attachment members may be secured to the elongate support member by one or more locking elements. Attachment members that are not secured to the elongate support member are captured securely between an attachment member on either side. In some embodiments only a top attachment member may be secured to the elongate support member, or only a top attachment member and a bottom attachment member may be secured to the elongate support member, by the locking elements 70 or the locking elements 70 and a fastener to penetrate the elongate support member via a hole 212 in the attachment member, as described above.

Figure 6A:
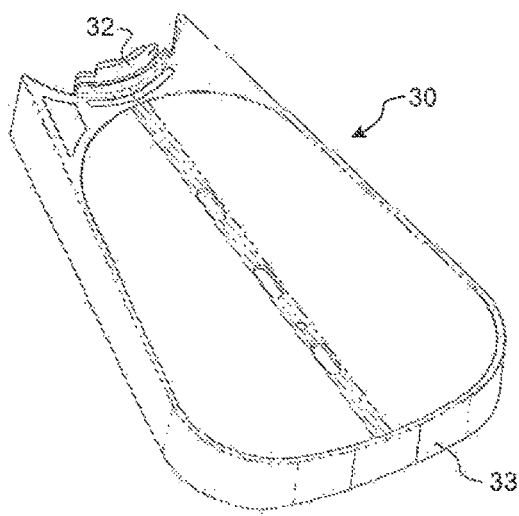
FIGS. 6A to 6C illustrate a step of the staircase of FIG. 1.
Figure 6B:
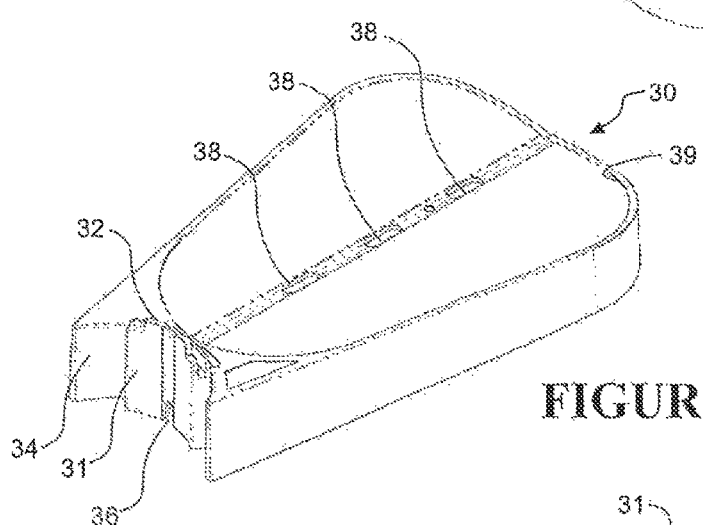
Figure 6C:
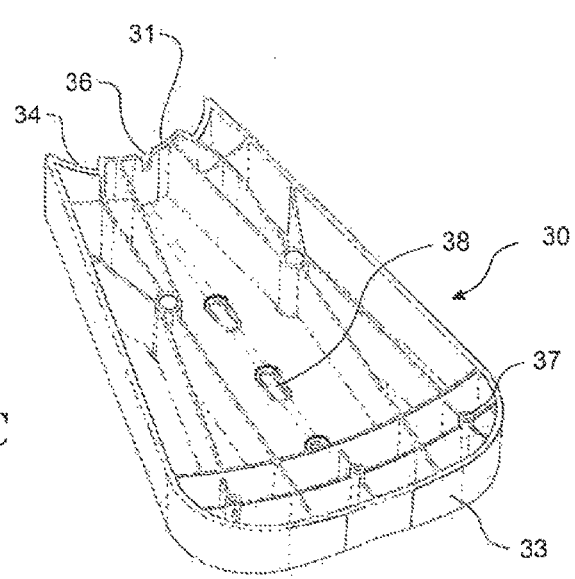

Each attachment member comprises a fixing detail for attaching a step to the attachment member. The fixing detail may be one or more fastener holes for receiving one or more fasteners for fixing a step to the attachment member. In the illustrated embodiment, with reference to FIG. 3E, the fixing detail comprises a recess 209 in an outer surface of the attachment member. A top portion 210 of the recess is covered by a wall portion 211 of the attachment member for receiving an upwardly extending member of the step 30. As shown in FIG. 6A to 6C each step 30 comprises a block 31 sized to fit within the recess 209 of the attachment member. Sides of the block 31 bear against sides of the recess to position the step correctly to the attachment member. Each step comprises an upwardly extending member 32. To fit the step to the attachment member, an outer end 33 of the step is angled upwards relative to the hollow column formed by the attachment members, to insert the upwardly extending member 32 into the recess and behind the wall portion 211 of the attachment member. The outward end 33 of the step is then lowered to move the block into the recess. The block fixes the angular position of the step to the attachment member. An inwardly facing surface or end 34 of the step bears against an outwardly facing surface of the attachment member, and the upwardly extending member bears against an inside of the wall portion 211 to secure the step to the attachment member. In some embodiments, the fixing detail comprises a fastener hole 212 within the recess to further secure the step to the attachment member. A fastener may secure the step to the attachment member and also penetrate the elongate support member to fix the attachment member to the elongate support member. As shown in FIG. 6C, in some embodiments the step comprises a hole or slot 36 for receiving a fastener for securing the step to the attachment member via the fastener hole 212. FIG. 6C illustrates a slot 36 open to a bottom edge of the step, however in some embodiments the step comprises a hole that is not open to an edge of the step. FIGS. 7A and 7B illustrate a step 30 fitted to an attachment member 20 in more detail. Fastener 35 for retaining the step to the attachment member is visible in FIGS. 7A and 7B.

In some embodiments the upwardly extending member 32 is weaker than the wall portion 209 so that the step breaks away from the attachment member without substantial damage to the column formed by the attachment members when exposed to an excessive load. For example, where an excessive weight is applied to a step, preferably the upwardly extending member is designed to fail so that the single step snaps off, without destroying the rest of the spiral staircase.

In some embodiments, the steps each comprise a fixing detail for securing the step to a vertical surface, such as a wall. As illustrated in FIG. 6C, each step may comprise a fastener hole or holes 37 for attaching an angled bracket to be fixed to a vertical wall. A top step of the staircase may be fixed to a wall, for example below a door or landing or balcony via a bracket attached to the fixing detail of the step. In some embodiments the outside diameter of the attachment members is of a size such that a standard sized pipe clamp may be used to secure the hollow column to a vertical surface. For example, the outside diameter of the hollow column may be 100 mm to be secured to a vertical wall by a 100 mm pipe clamp.

In some embodiments each step comprises apertures 38 to prevent water pooling on the step. The upper surface of the step may be inclined towards the apertures to allow the water to drain via the apertures. In the illustrated embodiment the upper surface of the step is inclined from edges of the step towards a centreline of the step where the apertures 38 are located. The step may comprise a central channel in which the apertures 38 are located to direct water on the step surface to the apertures. The step may comprise a lip 39 around the step. A non-skid cover may be attached to the upper surface of the step to fit within the lip 39. Further the lip may provide a rim around the perimeter of the step that forms a 'claw edge' or claw grip that a pet such as a cat may use to hook a claw over when climbing the stair case.

As described with reference to FIG. 1, in some embodiments, attachment members may be included in a staircase assembly as spacers only. That is, some attachment members do not have a step attached. Where an attachment member 30 does not have a step attached, preferably a cover 80 is provided to cover the fixing detail. A cover 80 is visible in FIG. 1 and in FIG. 7A, and is shown in detail in FIGS. 10A to 10F. In the illustrated example, the cover is curved to fit the curvature of the attachment member and is adapted to cover the recess 209 of the fixing detail of the attachment member. The cover has one or more upwardly extending members 81 to fit behind the wall portion 211 of the attachment member described above in relation to fitment of the steps to the attachment members. A bottom-end of the cover is provided with a clip or hook 82 for engaging a complementary feature or recess 216 (FIG. 3D) to retain the cover in place over the fixing detail. By covering the fixing detail the cover converts the attachment member into a spacer to be incorporated in the hollow column 11 to space adjacent steps apart. The cover may include a cut away 83 to provide access to the hook to remove the cover from an attachment member.

Figure 8A:
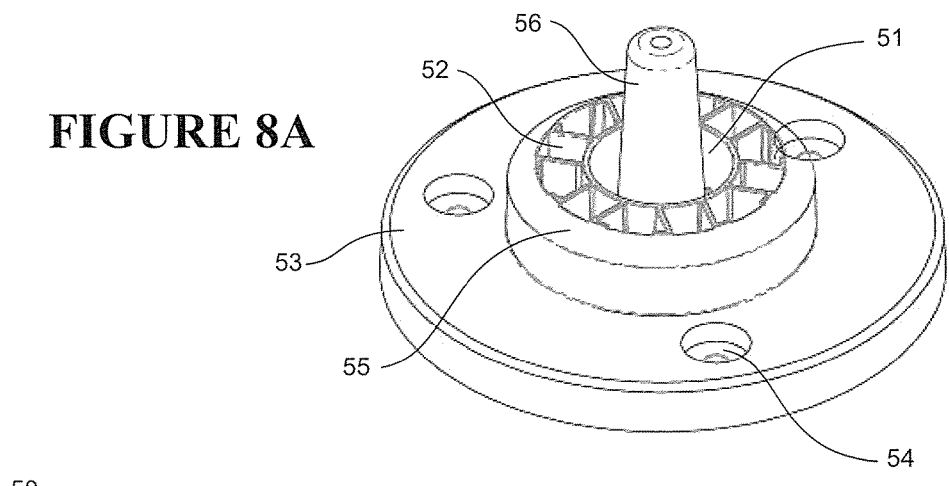
FIGS. 8A to 8C illustrate a base of the staircase of FIG. 1.
Figure 8B:
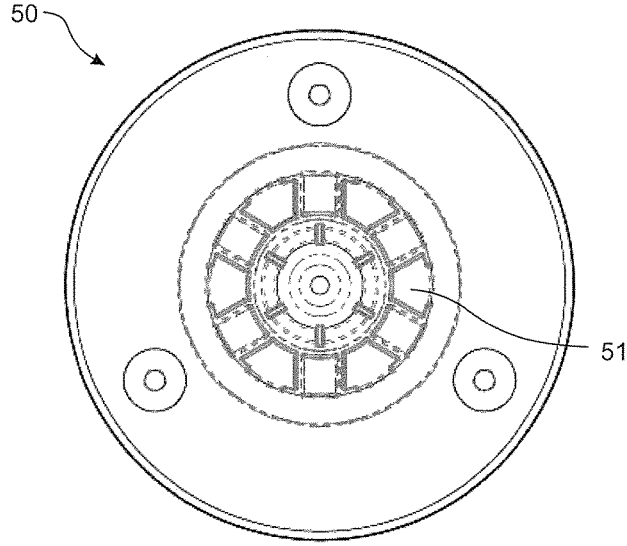
Figure 8C:
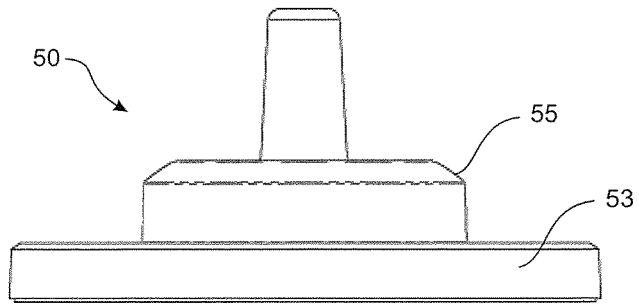

As described with reference to FIG. 1, preferably the staircase or kit of parts comprises a base 50. An example base component is illustrated in FIGS. 8A to 8C. The base 50 comprises an aperture or recess 51 for receiving an end of the elongate support member 40. An upper end of the base is adapted to engage an end of an attachment member 30 to be secured to the elongate support member 40 above the base. For example, as shown, the upper end of the base comprises openings 52 for receiving projections 206 extending from an attachment member. In some embodiments the openings 52 are larger than the projections so that the projections do not bear against the base. Therefore in some embodiments the angular position of the base relative to the attachment member is not fixed by projections 206.

The base has a bottom end adapted to fix the base to a floor or ground surface. For example, the base comprises a flange 53 at the bottom end of the base, and fastener holes 54 in the flange for securing the base to a floor or ground surface.

Figure 9D:
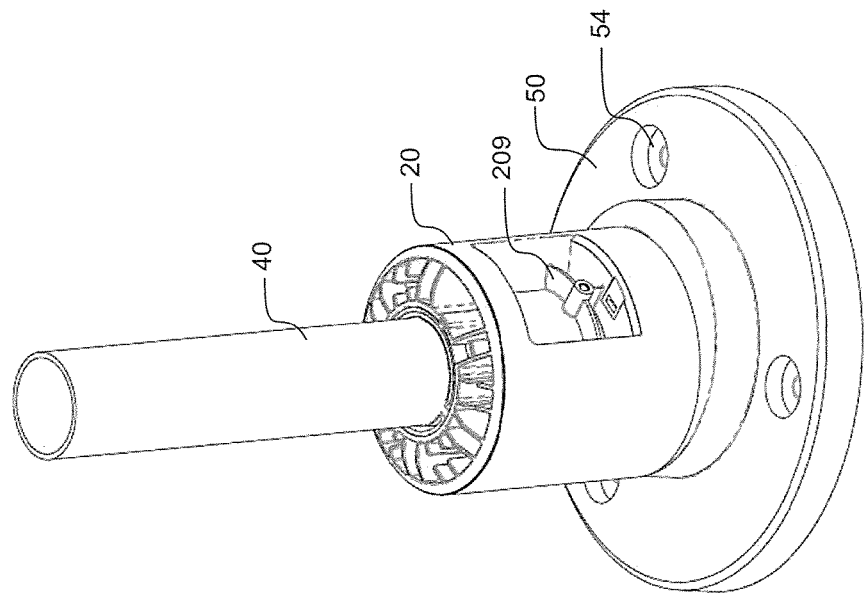
FIG. 9D is a perspective view of the angled arrangement shown in FIG. 9C.
Figure 9C:
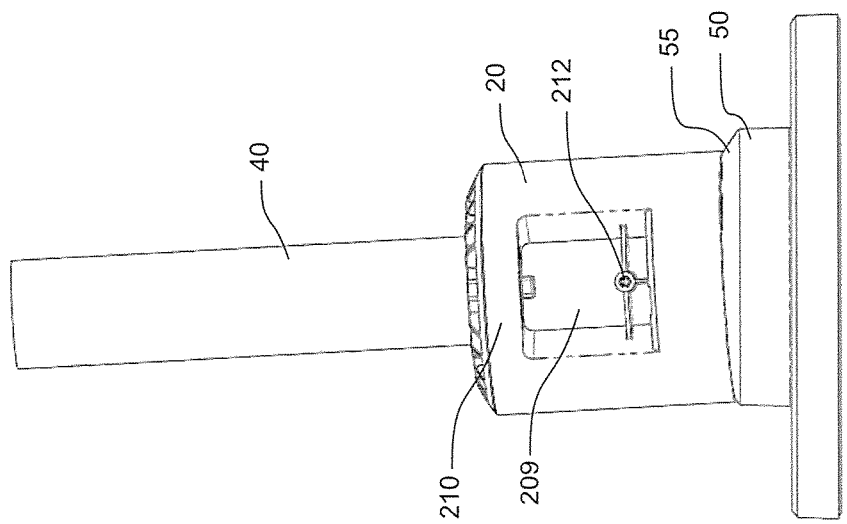
Figure 10A:
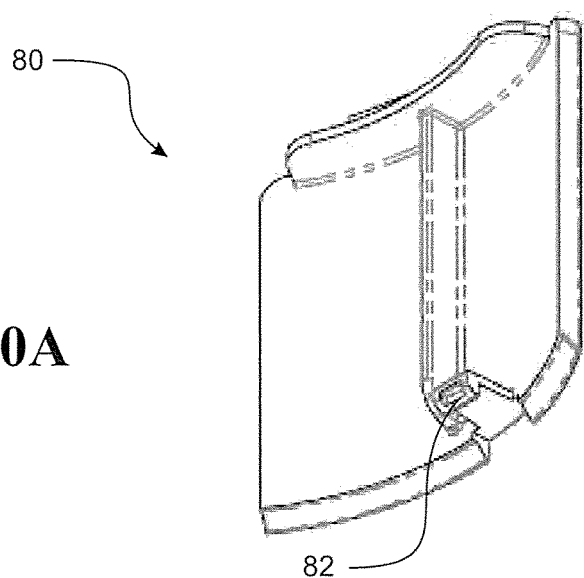
FIGS. 10A to 10F illustrate a cover for covering a fixing detail of the attachment member of FIGS. 3A to 3E.
Figure 10B:
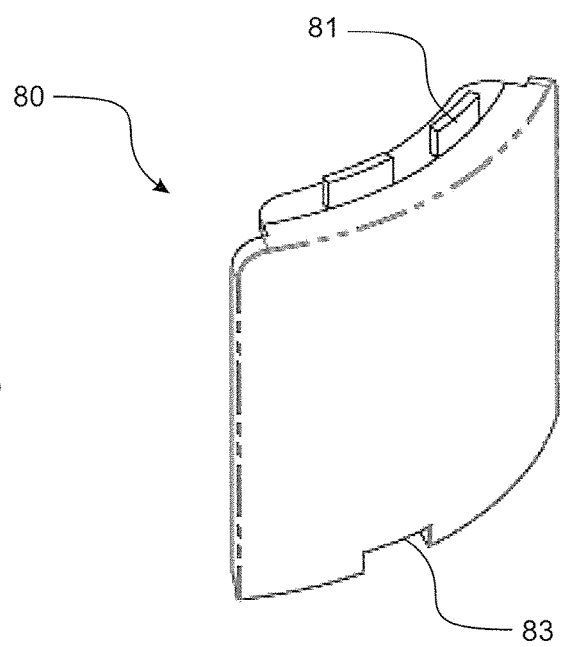
Figure 10C:
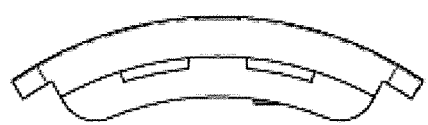
Figure 10D:
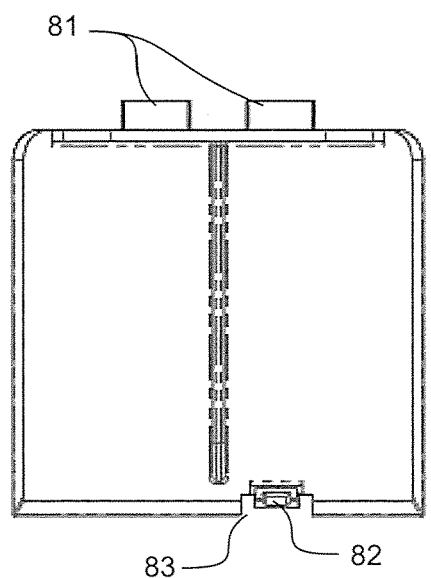
Figure 10F:
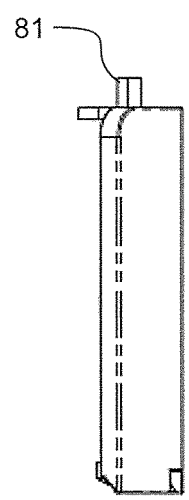
Figure 10E:
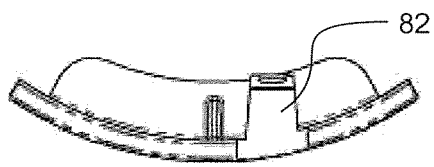
Figure 11A:
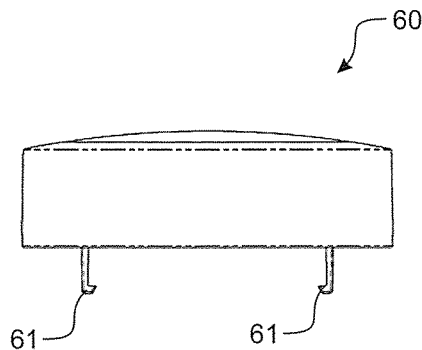
FIGS. 11A to 11E illustrate a cap of the staircase of FIG. 1.
Figure 11B:
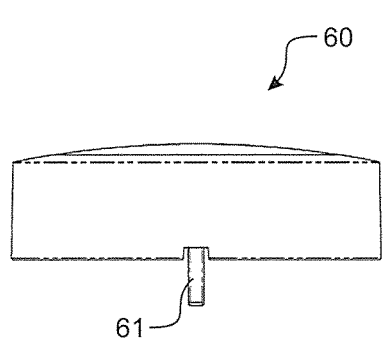
Figure 11C:
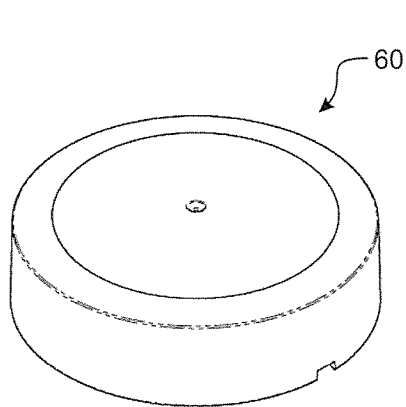
Figure 11D:
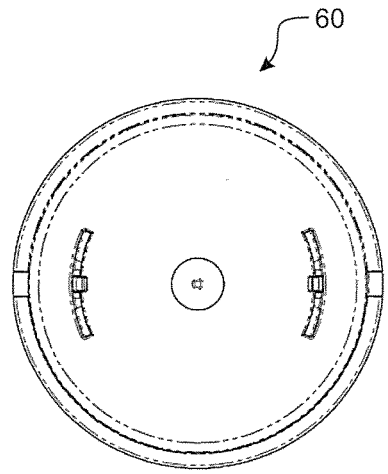
Figure 11E:
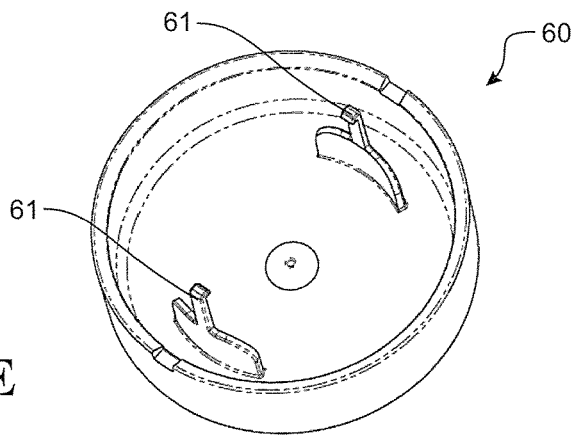

Preferably the base allows for misalignment between an axis of the base and an axis of the attachment member when the attachment member is fitted to the elongate support member, to account for a sloping or unlevel floor surface on which the staircase is to be mounted. In the illustrated embodiment, an upwardly facing surface 55 of the base and a complementary lower facing surface 214 of the attachment member are adapted to from a ball joint to allow for misalignment between the base and the attachment member. As shown in FIG. 9B, the upwardly facing surface 55 of the base forms the ball and the lower facing surface 214 of the attachment member forms the socket of the ball joint, however the attachment member may provide the ball and the base the socket. In some embodiments the base and attachment member are complementarily adapted to allow for angular misalignment or a sloping floor angle of at least 2 degrees, or at least 3 degrees, or at least 4 degrees, or at least 5 degrees. In some embodiments the base and attachment member are complementarily adapted to allow for angular misalignment of about 3 degrees. FIGS. 9C and 9D illustrate some misalignment between the base and the attachment member coupled to the base.

In some embodiments the base comprises a post 56 extending from the recess 51 to be received in a bore of the elongate support member. In use, a user or installer may drive a pin, through the attachment member fitted to the base, the elongate member and the post to secure the base, attachment member and elongate support member together. For example, a user or installer may drill a hole through the attachment member, the pipe and the post to provide a hole to drive a pin 220 through the three components as illustrated in FIG. 9B. In some embodiments, the base may simply be captured between a ground or floor surface and the column 11 of the staircase that is fixed to a vertical wall as described above.

Figure 13:
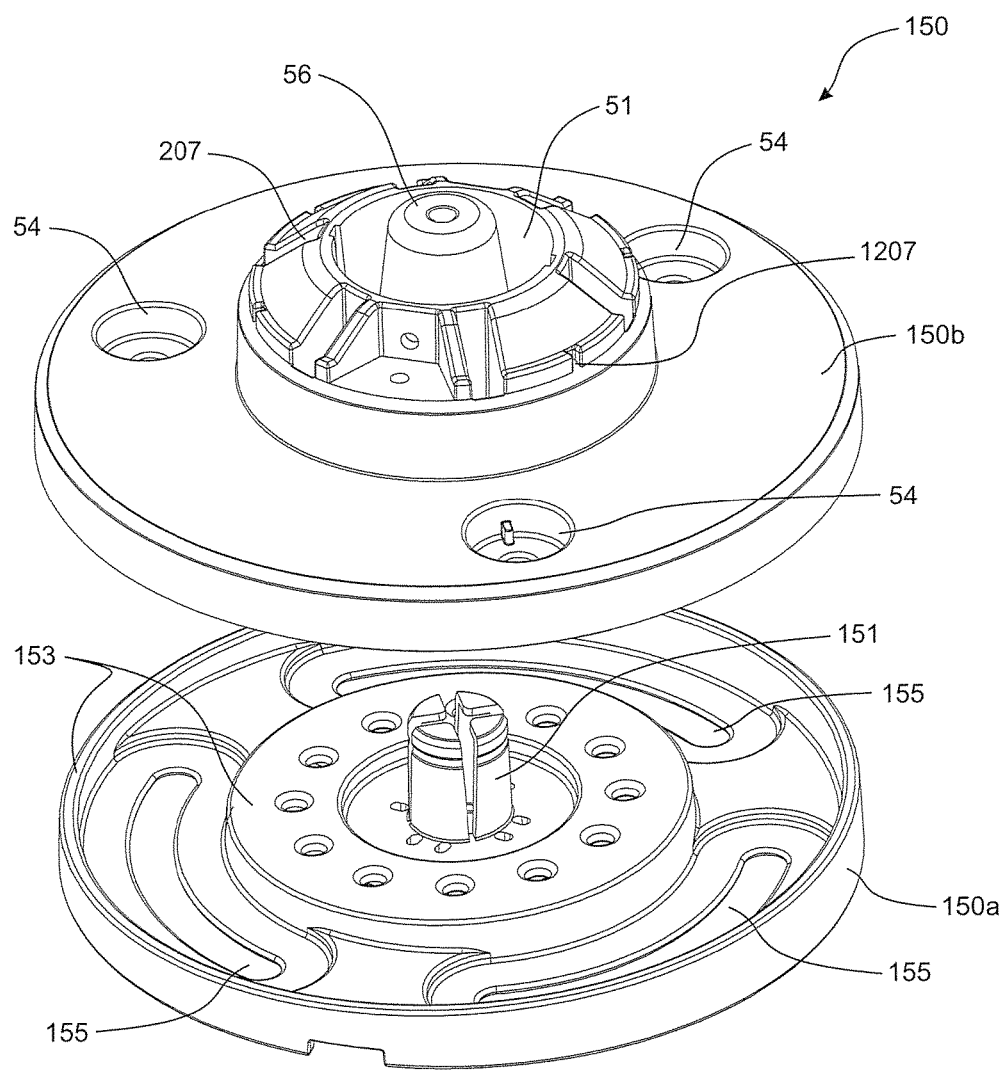
FIG. 13 shows an exploded view of a base assembly for use in a stair case similar to the stair case shown in FIG. 1.
Figure 14A:
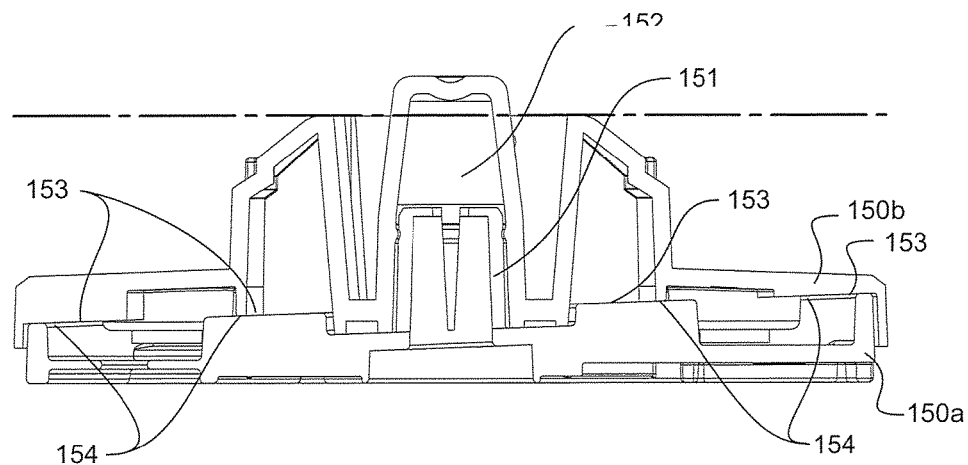
FIGS. 14A and 14B illustrate the base assembly of FIG. 13.
Figure 14B:
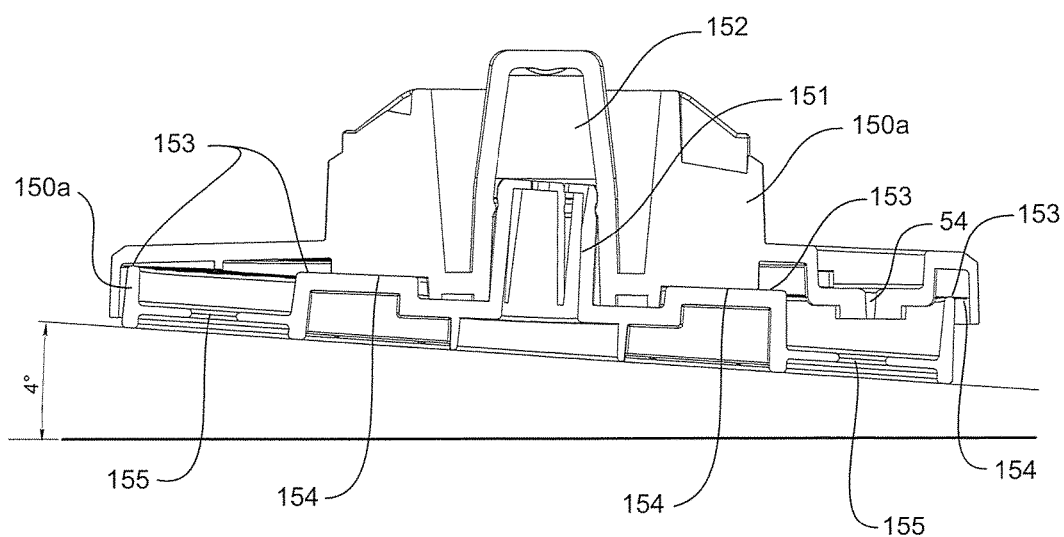

An alternative base is illustrated in FIGS. 13 to 14B. The base 150 is a base assembly comprising a bottom base component 150a and a top base component 150b. The top and bottom base components are adapted to be rotationally fitted together so that they may rotate relative to one another. The top and bottom base components are adapted to be rotationally fitted together to rotate relative to one another about an axis that is substantially vertical in use. For example, in the illustrated embodiment the bottom component comprises a post 151 that is received in a recess 152 of the top component. There may be a snap fit arrangement between the post and recess so that they stay coupled together. For example the post has a split configuration to allow parts of the post to defect inwards to allow a circumferential projection on an inner surface of the recess to ride over an outer surface of the post to be received in a groove in the outer surface of the post. Once the circumferential projection is located in the groove the parts of the post may deflect outwards to an un-deflected position so that the top component is rotationally coupled to the bottom component.

The bottom base component 150a has a sloping upper surface 153 and the top base component 150b has a corresponding sloping bottom surface 154, so that relative rotation between the bottom and top components causes the bottom surface of the bottom component to tilt relative to the top component to account for a sloping ground or floor surface. FIG. 14A illustrates a relative angular position between the bottom and top components with the sloping surfaces 153, 154 arranged so that the base assembly is in a perpendicular configuration with a bottom surface of the bottom component perpendicular to a vertical axis of the top component 150b and the hollow column, for use with a level floor or ground surface. FIG. 14B illustrates a relative angular position between the bottom and top components with the sloping surfaces 153, 154 arranged so that the bottom surface of the bottom component is at a maximum slope or angle to the vertical axis of the top component, for use on a sloping floor or ground surface. In the illustrated embodiment, the surfaces 153, 154 are arranged so that the base assembly 150 can account for a maximum slope in a floor or ground surface of 4 degrees. In alternative embodiments the sloping surfaces 153, 154 may be complementary adapted to provide for more or less maximum tilt. The components may be rotated by 180 degrees to move from the perpendicular configuration for a level floor surface to the maximum tilted configuration as shown in FIG. 14B. To account for an amount of tilt less than the maximum tilt the bottom component may be rotated by less than 180 degrees relative to the top component.

A top of the top component is configured to fit the bottom of an attachment member, for example the attachment member shown in FIGS. 12A and 12B. The top base component comprises openings 207 to accept projections 206 of the attachment member, and openings 1207 to accept projections 1206 of the attachment member. The projections 206 and corresponding openings 207 may rotationally lock base assembly to the attachment member. The projections 1206 and corresponding openings 1207 may rotationally lock base assembly to the attachment member. The top component may comprise an aperture or recess 51 for receiving an end of the elongate support member 40. The post 56 may extend inside the elongate support member.

Each of the top and bottom components 150a, 150b may comprise a flange with holes for securing the base assembly to the floor or ground surface. In the illustrated embodiment the top component has holes 54 and the bottom component has complementary circumferential slots 155. Fasteners may be provided through holes 54 and slots 155 to secure the base assembly to the ground or floor once the angle of the base assembly has been set by relative rotation between the top and bottom base components. Caps (not shown) may be provided to the holes 54 to cover the holes 54 and fasteners.

In some embodiments the kit of parts may comprise a base that does not account for an unlevel for surface. For example, a circular (e.g. a disc shape) component with the same or similar diameter to the outer diameter of the attachment member that can be attached to a ground or floor surface (e.g. by screws or bolts) may form the base of the assembly. An upper end of the base is adapted to fit to the lower end of an attachment member and may also receive the bottom end of the elongate support member.

In some embodiments the staircase or kit of parts comprises a cap component adapted to attach to an upper end of a said attachment member. A cap 60 is illustrated in FIG. 1 and is shown in detail in FIGS. 11A to 11E. In some embodiments, as illustrated, the cap may comprise two or more hooks 61 and each attachment member may comprises two or more corresponding holes 217 (FIG. 3A) for receiving said hooks for securing the cap the upper end of the attachment member.

The various components such as the attachment members, steps, fixing detail covers, the base component and the cap may be formed from a suitable plastics material such as polypropylene. Preferably the material is resistance to UV radiation to be suitable for use outdoors in direct sunlight.

The present invention has been described by example with reference to a spiral staircase and a kit of parts for building a spiral staircase, and particularly to a spiral staircase for a pet such as a cat. However, the present invention comprising an attachment member with a fixing detail, and locking elements for securing that attachment member to an elongate support member, may be applied usefully for purposes other than for building a staircase. The present invention provides an arrangement for attaching fixtures to an elongate support member without a requirement for providing complementary fixing details on that support member. With reference to the exemplary embodiment, the steps 30 are fixtures secured to the elongate support member 40 by way of the attachment members. Other uses for the present invention are apparent. For example, the present invention may allow for hooks to be secured to a pole without a requirement for the hooks to be directly attached to the pole. In this example the hooks are fixtures that are secured to an elongate support member 40 by attachment members 20. A column supporting hooks may be useful in a retail environment for hanging goods from a vertical support member to display the goods for sale. In some installations the elongate support member need not be arranged vertically.

The foregoing description of the invention includes preferred forms thereof. Modifications may be made thereto without departing from the scope of the invention as defined by the accompanying claims.

The invention claimed is:

1. A kit of parts for building a staircase around a vertical elongate support member comprising:
   a plurality of attachment members, each attachment member of the plurality of attachment members comprising:
      an aperture for receiving the elongate support member, the aperture being larger than a lateral dimension of the elongate support member to provide a gap between each attachment member of the plurality of attachment members and the elongate support member when received in the aperture, and
      a fixing detail,
   a plurality of locking elements, the plurality of attachment members and the plurality of locking elements adapted so that each locking element of the plurality of locking elements secures not more than one attachment member of the plurality of attachment members to the elongate support member by friction when received in the gap,
   each attachment member of the plurality of attachment members adapted to engage an adjacent attachment member of the plurality of attachment members to align the plurality of attachment members laterally and form a hollow column secured around the elongate support member, and
   a plurality of steps, each step of the plurality of steps adapted to be attached to one of the plurality of attachment members via the fixing detail.

2. A kit of parts as claimed in claim 1 wherein each locking element of the plurality of locking elements is a wedge.

3. A kit of parts as claimed in claim 1 wherein the aperture is circular for receiving an elongate support member with a circular cross section, the inner diameter of the aperture being greater than the outer diameter of the elongate support member to provide an annular gap between the plurality of attachment members and the elongate support member when received in the aperture, and
   each locking element of the plurality of locking elements is a curved locking element to fit in the annular gap to secure the attachment member to the elongate support member by friction.

4. A kit of parts as claimed in claim 3 wherein each locking element of the plurality of locking elements is a curved wedge to fit around the outside diameter of the elongate support member.

5. A kit of parts as claimed in claim 4 wherein the curved wedge is adapted to deform elastically to fit about a range of different diameter elongate support members.

6. A kit of parts as claimed in claim 4 wherein two or more curved wedges are adapted to be located side-by-side around the perimeter of the aperture in the gap.

7. A kit of parts as claimed in claim 6 wherein the curved wedges have a circumferential length extending less than 180 degrees such that a gap remains between adjacent curved wedges when securing the attachment member to the elongate support member.

8. A kit of parts as claimed in claim 1 wherein each locking element of the plurality of locking elements or each attachment member of the plurality of attachment members comprises a key and the other one of each locking element of the plurality of locking elements or each attachment member of the plurality of attachment members comprises a corresponding keyway, the key and keyway aligned with a longitudinal axis of the aperture and elongate support member.

9. A kit of parts as claimed in claim 1 wherein at least one locking element of the plurality of locking elements comprises at least one lateral shoulder in an outer surface of the at least one locking element for engaging a tool to lever the at least one locking element out of the gap.

10. A kit of parts as claimed in claim 9 wherein each locking element of the plurality of locking elements or each attachment member of the plurality of attachment members comprises a key and the other one of each locking element of the plurality of locking elements or each attachment member of the plurality of attachment members comprises a corresponding keyway, the key and keyway aligned with a longitudinal axis of the aperture and elongate support member, and
   each attachment member of the plurality of attachment members comprises a recess or port providing access to the lateral shoulder, angular alignment of the lateral shoulder and the port or recess achieved by engagement between the key and keyway.

11. A kit of parts as claimed in claim 1 wherein each attachment member of the plurality of attachment members has a recess for receiving an end of a locking element of the plurality of locking elements extending from an adjacent attachment member of the plurality of attachment members.

12. A kit of parts as claimed in claim 1 wherein each attachment member of the plurality of attachment members comprises:
   protrusions or openings at one end of the attachment member spaced circumferentially around the aperture, and
   corresponding openings or protrusions at the other end of the attachment member spaced circumferentially around the aperture,
   the protrusions and openings adapted to engage corresponding openings or protrusions on an adjacent attachment member of the plurality of attachment members secured to the elongate support member.

13. A kit of parts as claimed in claim 12 wherein the protrusions and openings are arranged to determine an angular relative position between adjacent attachment members of the plurality of attachment members.

14. A kit of parts as claimed in claim 1, wherein the fixing detail of each attachment member of the plurality of attachment members comprises a recess in an outer surface of the attachment member, a top portion of the recess covered by a wall portion of the attachment member, and
   each step of the plurality of steps comprises an upwardly extending member adapted to extend into the recess and bear against an inner surface of the wall portion to fit the step to the attachment member, and
   the upwardly extending member has a lower strength than a strength of the wall portion so that the step breaks away from the column without damage to the column when exposed to a load sufficient to break the upwardly extending member.

15. A kit of parts as claimed in claim 1 comprising one or more covers, each cover adapted to cover the fixing detail on one attachment member of the plurality of attachment members.

16. A kit of parts as claimed in claim 1 wherein the kit of parts comprises a base, the base comprising a recess or aperture for receiving an end of the elongate support member, an upper end of the base adapted to engage an attachment member of the plurality of attachment members to be secured to the elongate support member above the base, and a bottom end of the base adapted to fix the base to a floor or ground surface.

17. A kit of parts as claimed in claim 16 wherein the base comprises a post extending from the recess to be received in a hollow bore of the elongate support member.

18. A kit of parts as claimed in claim 16, wherein the base is a base assembly adapted to be adjusted from a perpendicular configuration for use on a level floor surface to a tilted configuration for use on a sloping floor surface with the hollow column vertical.

19. A kit of parts as claimed in claim 18, the base assembly comprises a bottom component and a top component, the top and bottom components adapted to be rotationally fitted together to rotate relative to one another, the bottom component having a sloping upper surface and the top component having a corresponding sloping bottom surface, such that relative rotation between the bottom and top components adjusts the base assembly between the perpendicular configuration and the tilted configuration.

20. A modular staircase comprising:
a vertical elongate support member,
a plurality of attachment members fitted to the vertical elongate support member, each attachment member of the plurality of attachment members comprising:
  an aperture for receiving the elongate support member, the aperture being larger than a lateral dimension of the elongate support member to provide a gap between each attachment member of the plurality of attachment members and the elongate support member when received in the aperture, and
  a fixing detail,
a plurality of locking elements received in the gaps between the plurality of attachment members and the elongate support member, and wherein each locking element of the plurality of locking elements secures not more than one attachment member of the plurality of attachment members to the elongate support member by friction,
each attachment member of the plurality of attachment members engaging an adjacent attachment member of the plurality of attachment members to align the plurality of attachment members laterally and form a hollow column secured around the elongate support member, and
a plurality of steps, each step of the plurality of steps attached to one of the plurality of attachment members via the fixing detail.

* * * * *